(12) United States Patent
Laycock et al.

(10) Patent No.: US 8,449,361 B2
(45) Date of Patent: May 28, 2013

(54) SYSTEMS AND METHODS FOR SCORING COMPETITIVE STRATEGY PREDICTIONS OF USERS ON A PLAY-BY-PLAY BASIS

(75) Inventors: Lachlan Laycock, Paris (FR); Andrew Daines, New York, NY (US)

(73) Assignee: Pre Play Sports LLC, New York, NY (US)

( * ) Notice: Subject to any disclaimer, the term of this patent is extended or adjusted under 35 U.S.C. 154(b) by 0 days.

(21) Appl. No.: 13/276,191

(22) Filed: Oct. 18, 2011

(65) Prior Publication Data

US 2012/0129585 A1 May 24, 2012

Related U.S. Application Data

(60) Provisional application No. 61/394,010, filed on Oct. 18, 2010.

(51) Int. Cl.
*A63F 13/00* (2006.01)
*A63F 13/12* (2006.01)

(52) U.S. Cl.
USPC .................................. 463/9; 463/16; 463/42

(58) Field of Classification Search
USPC .......... 463/26–28, 25, 16, 20, 11–13, 17–19, 463/29, 30, 31, 40–42, 43, 9
See application file for complete search history.

(56) References Cited

U.S. PATENT DOCUMENTS

| | | | | |
|---|---|---|---|---|
| 5,018,736 A | * | 5/1991 | Pearson et al. | 463/29 |
| 5,263,723 A | * | 11/1993 | Pearson et al. | 463/41 |
| 5,573,244 A | * | 11/1996 | Mindes | 463/26 |
| 5,643,088 A | | 7/1997 | Vaughn et al. | |
| 5,713,793 A | * | 2/1998 | Holte | 463/25 |
| 5,813,913 A | | 9/1998 | Berner et al. | |
| 5,842,921 A | * | 12/1998 | Mindes et al. | 463/16 |
| 5,846,132 A | * | 12/1998 | Junkin | 463/42 |

(Continued)

FOREIGN PATENT DOCUMENTS

| | | |
|---|---|---|
| WO | WO 2006/004855 | 1/2006 |
| WO | WO 2006/004856 | 1/2006 |
| WO | WO 2007/002284 | 1/2007 |

OTHER PUBLICATIONS

International Search Report for PCT/US2011/056772, mailed on Mar. 2, 2012 (2 pages).

(Continued)

*Primary Examiner* — David L Lewis
*Assistant Examiner* — Matthew D. Hoel
(74) *Attorney, Agent, or Firm* — Choate Hall & Stewart LLP

(57) ABSTRACT

The present disclosure describes, among other things, a method that includes receiving, by a first computing device, an identity of an event that has occurred in a sporting competition, the sporting competition comprising a plurality of events. The method includes determining, by a processor of the first computing device, a probability that the event would occur. The method includes determining, by the processor of the first computing device, a number of points based at least in part on the probability that the event would occur. The method includes receiving, by the first computing device, a prediction of an event from a second computing device in communication with the first computing device. The method includes increasing, by the processor of the first computing device, a score of a user of the second computing device by the number of points if the prediction of the event matches the identity of the event.

20 Claims, 29 Drawing Sheets

1600

PREVIOUS

| QUARTER | TIME | PLAY | SCORE |
|---|---|---|---|
| 1 | 2:11 | JAMES RUSH TO THE RIGHT FOR 23 YARDS TO THE BUF13. TACKLED BY NIKOLAS | 25-16 |
| 1 | 2:23 | JAMES RUSH TO THE LEFT FOR NO GAIN TO THE BUF13. TACKLED BY GREG | 25-16 |
| 1 | 2:31 | ROY YOUNG INCOMPLETE PASS INTENDED FOR BO SAM | 25-16 |

CURRENT

| | | | |
|---|---|---|---|
| 1 | 2:23 | JAMES RUSH TO THE LEFT FOR NO GAIN TO THE BUF13. TACKLED BY GERG | 25-16 |

3300

LEADERBOARD

SEASON \ WEEK > 1 2 3 4 5 6 7 > OVERALL \ TEAM > POINTS \ PREDICT

| | NAME | TEAM | POINTS | PRED % | # PRED | AVG. PTS/PRED. |
|---|---|---|---|---|---|---|
| 1. | MAC ROOSWELL | DRAGS | 135 | 68% | 123 | 12 |
| 2. | GIM HALL | BOOZERS | 132 | 65% | 108 | 10 |
| 3. | GEORGE | BRICKS | 128 | 60% | 92 | 10 |
| 4. | TEENAX | CANNONS | 124 | 68% | 50 | 8 |
| 5. | TIN TIN | TWISTERS | 122 | 65% | 78 | 9 |

U.S. PATENT DOCUMENTS

| | | | |
|---|---|---|---|
| 5,860,862 A * | 1/1999 | Junkin | 463/40 |
| 6,371,855 B1 * | 4/2002 | Gavriloff | 463/42 |
| 6,712,701 B1 * | 3/2004 | Boylan et al. | 463/42 |
| 6,910,965 B2 | 6/2005 | Downes | |
| 7,477,954 B2 | 1/2009 | Laneve | |
| 8,002,618 B1 | 8/2011 | Lockton et al. | |
| 8,149,530 B1 | 4/2012 | Lockton et al. | |
| 2002/0068633 A1 | 6/2002 | Schlaifer | |
| 2003/0096651 A1* | 5/2003 | Black | 463/42 |
| 2005/0288080 A1 | 12/2005 | Lockton et al. | |
| 2005/0288101 A1 | 12/2005 | Lockton et al. | |
| 2007/0028272 A1 | 2/2007 | Lockton | |
| 2007/0054695 A1 | 3/2007 | Huske et al. | |
| 2007/0078009 A1 | 4/2007 | Lockton et al. | |
| 2010/0113135 A1 | 5/2010 | Asher et al. | |
| 2011/0306428 A1 | 12/2011 | Lockton et al. | |

OTHER PUBLICATIONS

Written Opinion for PCT/US2011/056772, mailed on Mar. 2, 2012 (8 pages).

"Interview: AirPlay CEO Morgan Guenther", published on Apr. 7, 2006 (2 pages).

"Take your favorite TV to the next level", published on Jul. 25, 2008. Accessed via the WayBack Machine, http://web.archive.org/web/20080725002132/http://www.airplay.com/Games/tap. (21 pages).

* cited by examiner

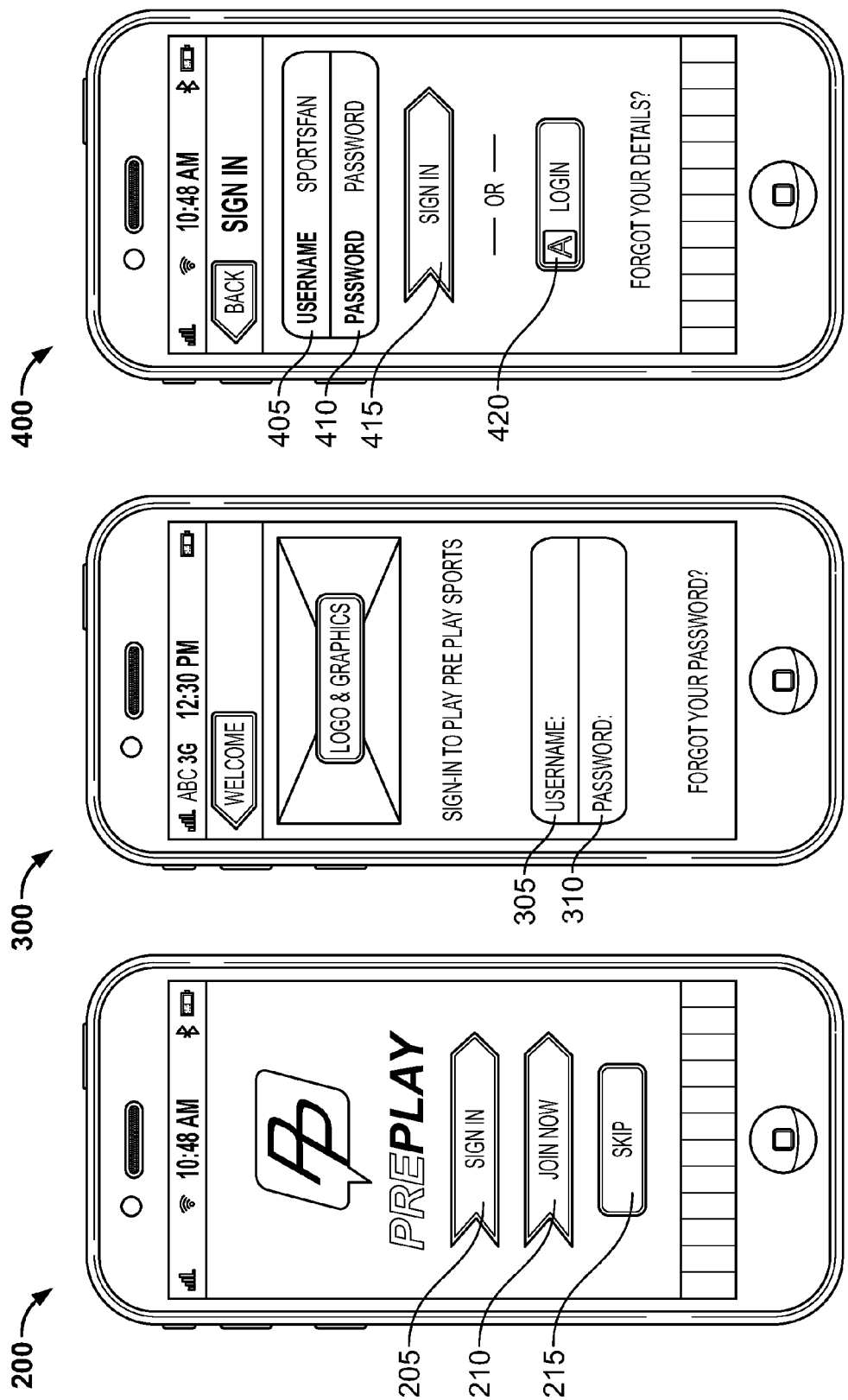

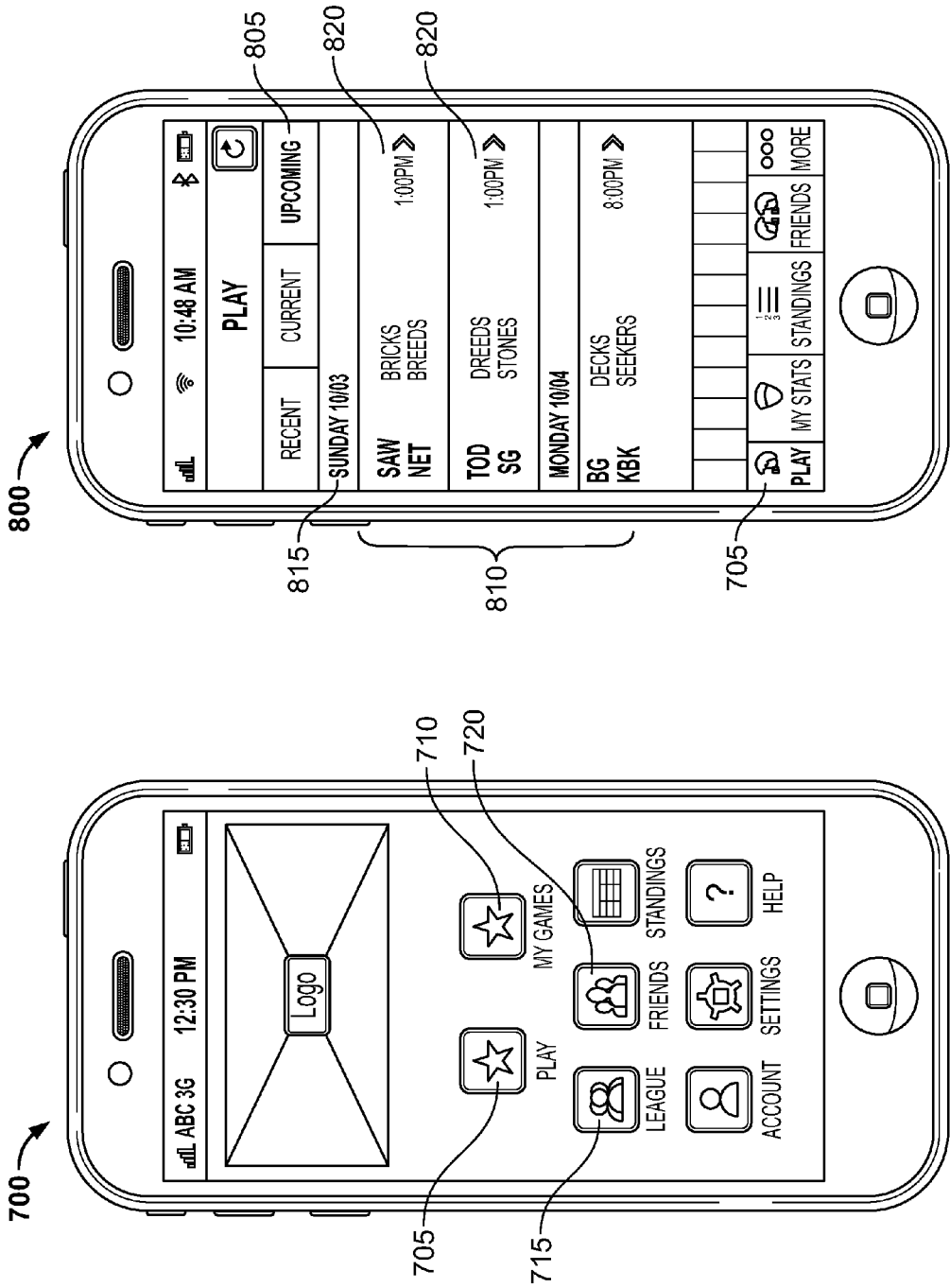

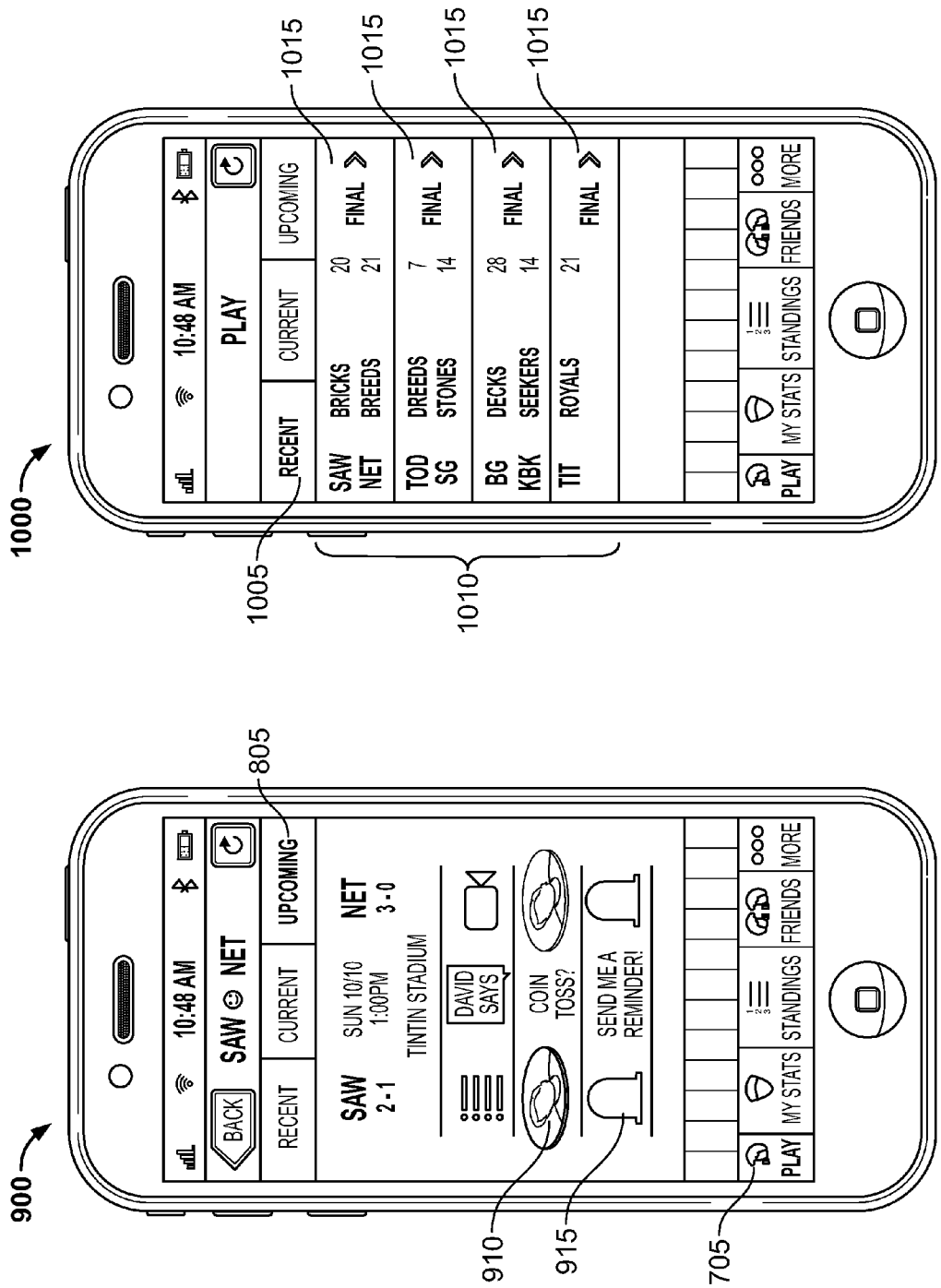

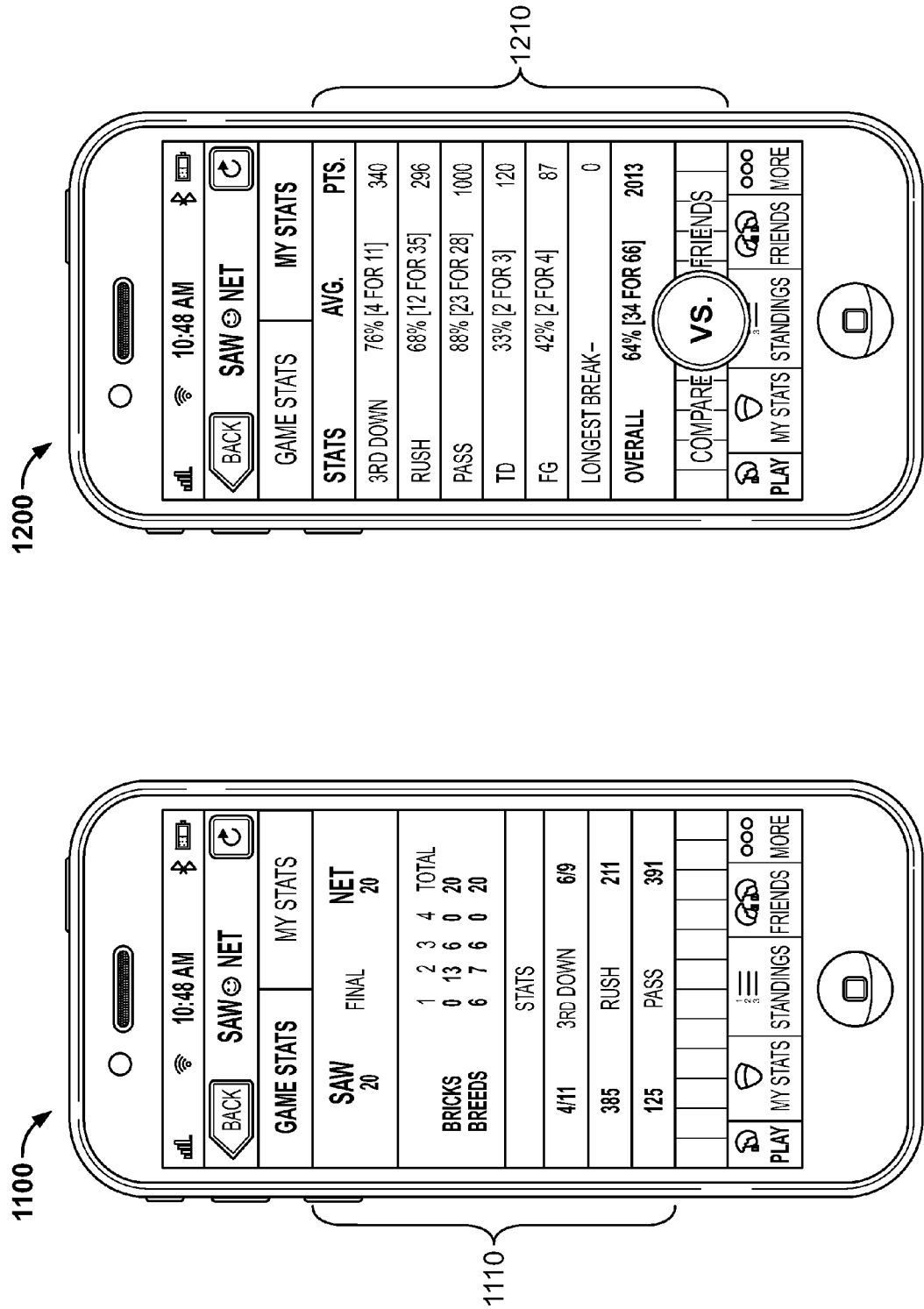

1600

PREVIOUS

| QUARTER | TIME | PLAY | SCORE |
|---|---|---|---|
| 1 | 2:11 | JAMES RUSH TO THE RIGHT FOR 23 YARDS TO THE BUF13. TACKLED BY NIKOLAS | 25-16 |
| 1 | 2:23 | JAMES RUSH TO THE LEFT FOR NO GAIN TO THE BUF13. TACKLED BY GREG | 25-16 |
| 1 | 2:31 | ROY YOUNG INCOMPLETE PASS INTENDED FOR BO SAM | 25-16 |

CURRENT

| | | | |
|---|---|---|---|
| 1 | 2:23 | JAMES RUSH TO THE LEFT FOR NO GAIN TO THE BUF13. TACKLED BY GERG | 25-16 |

*FIG. 16*

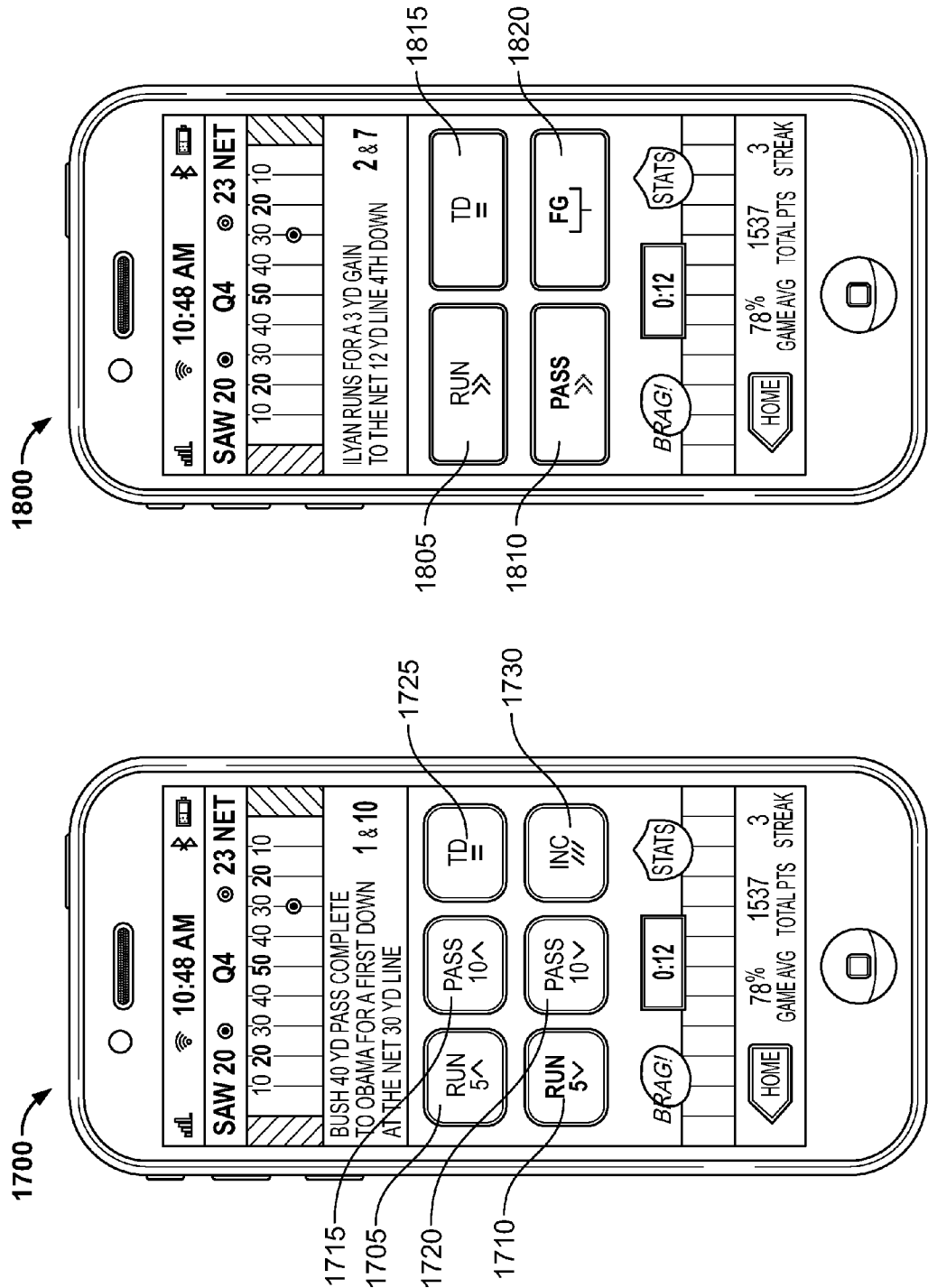

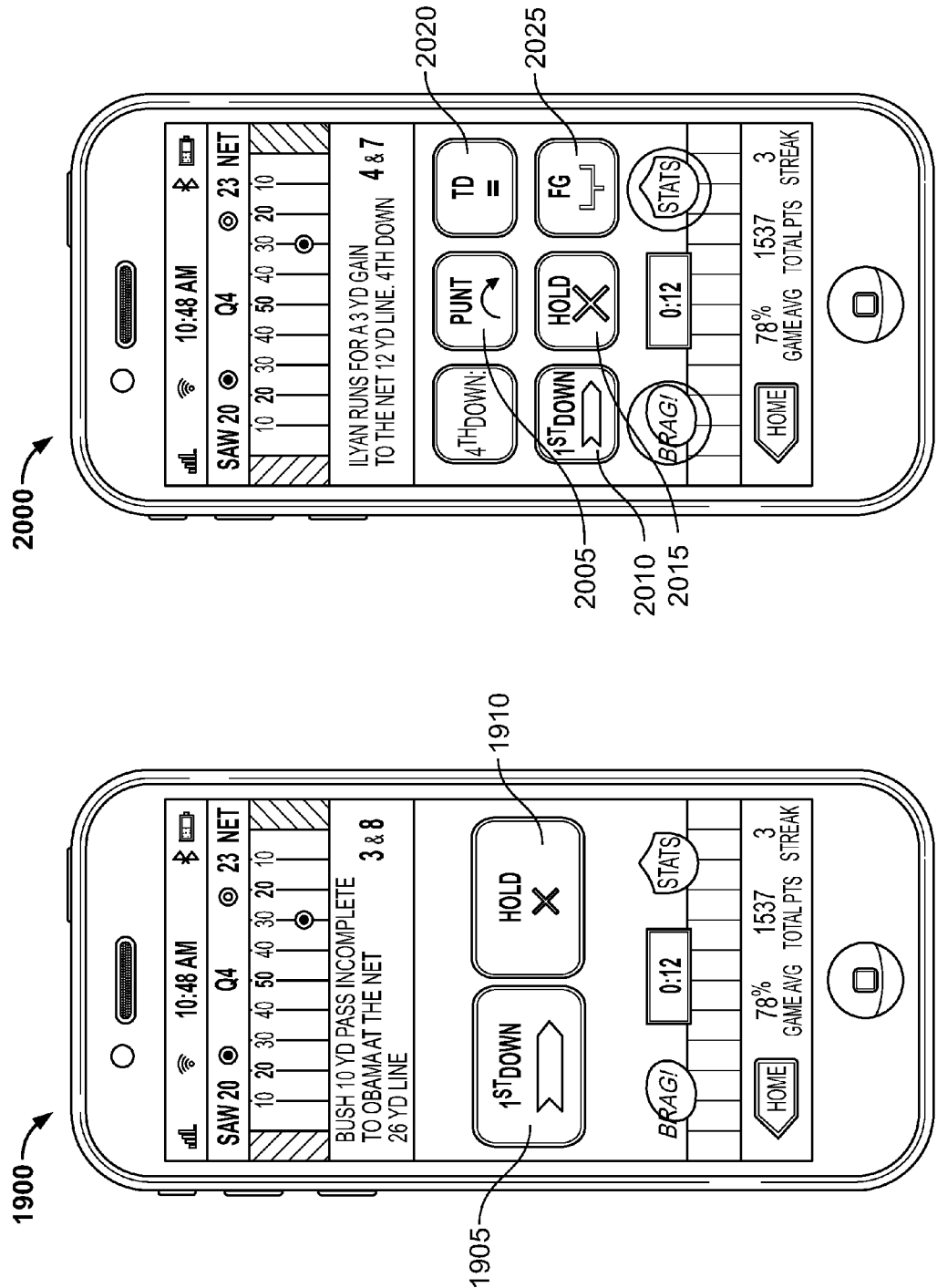

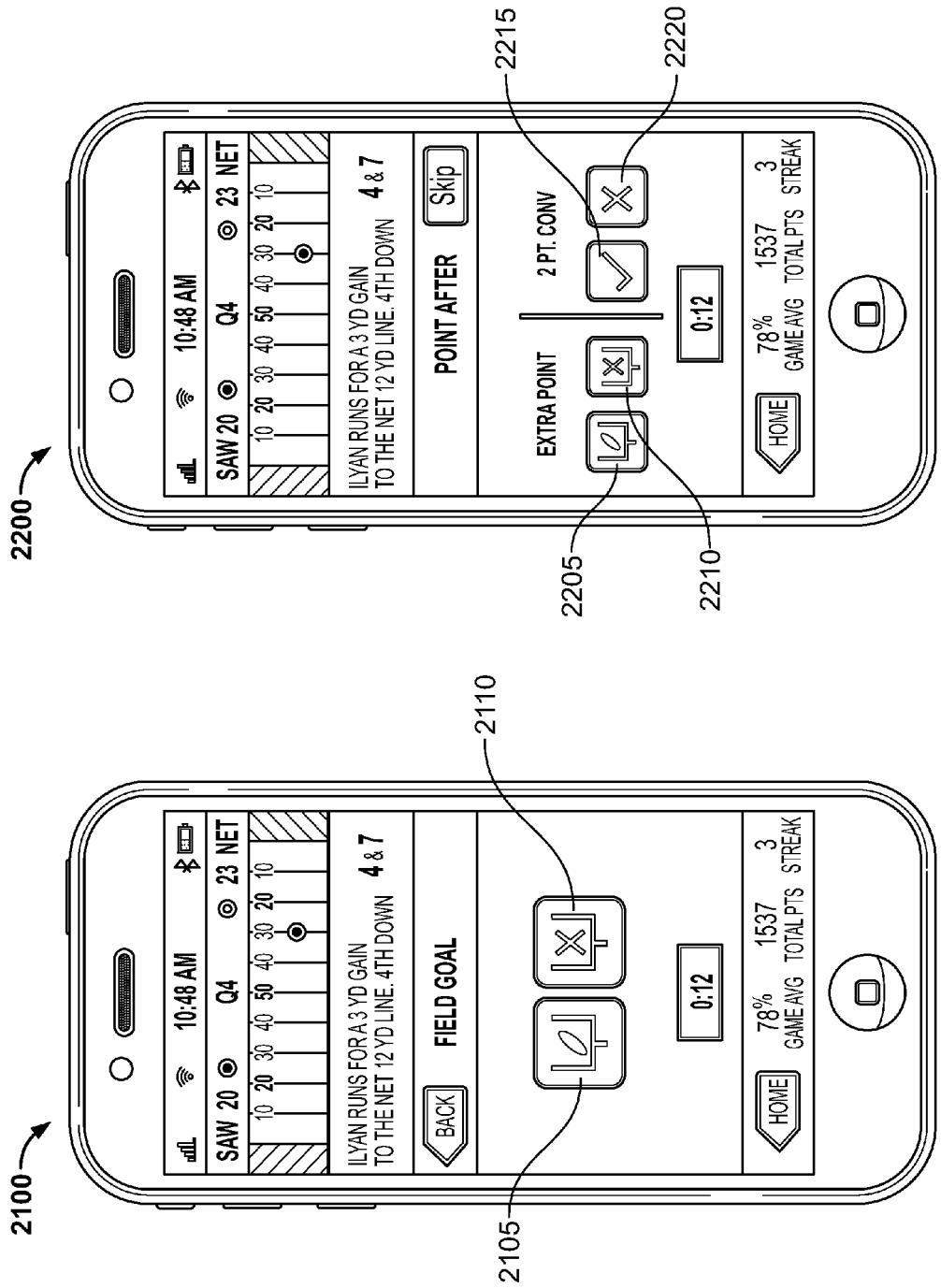

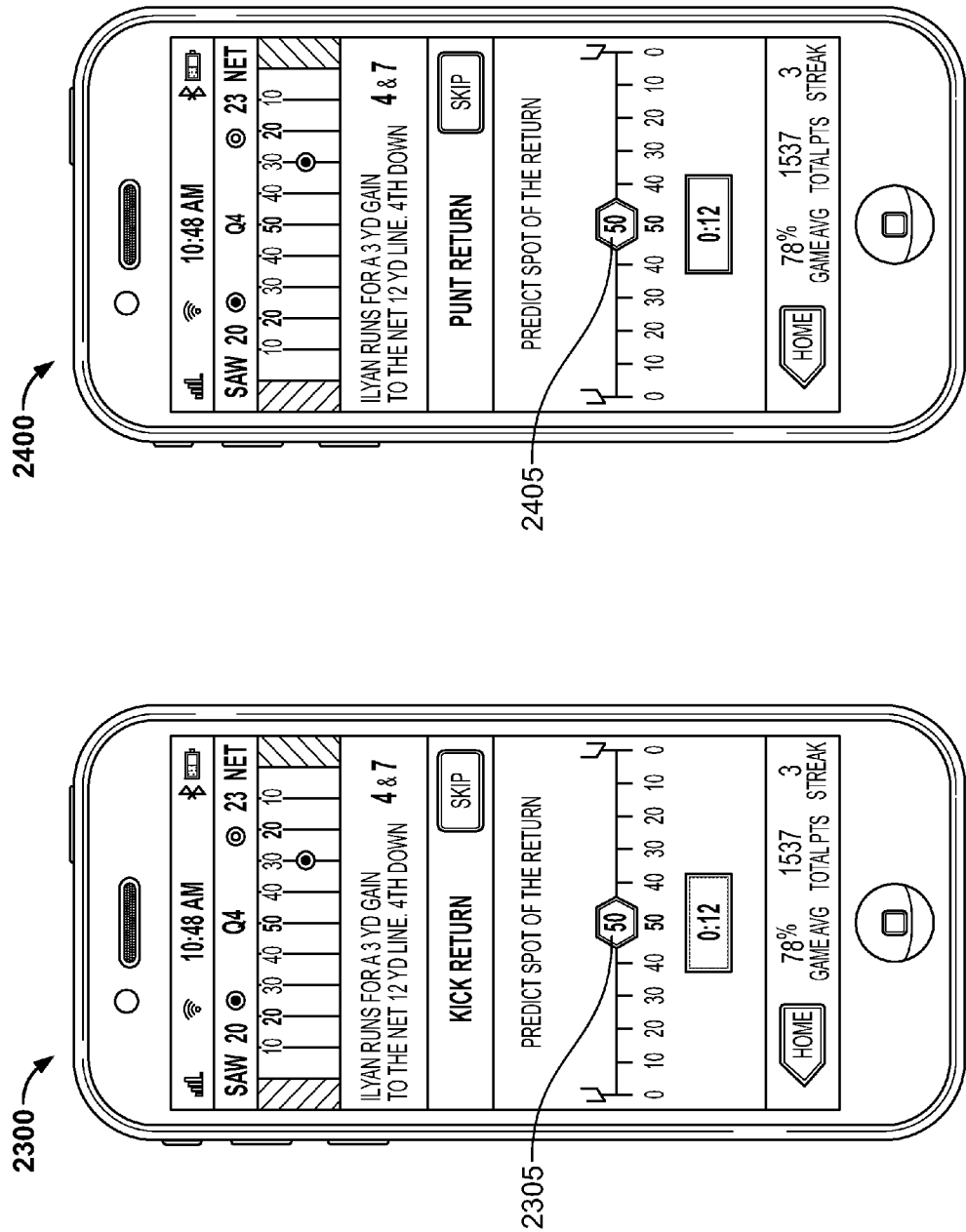

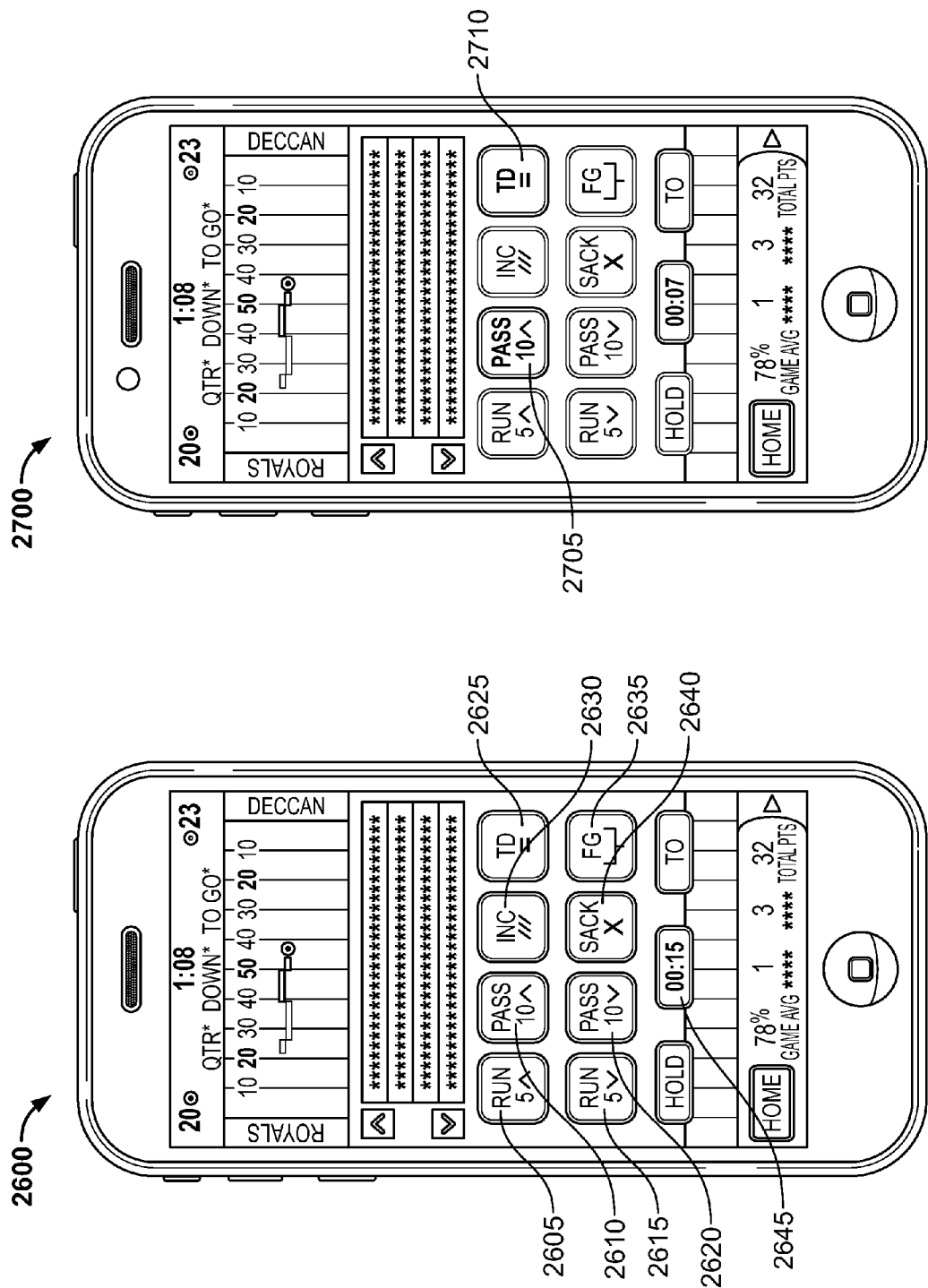

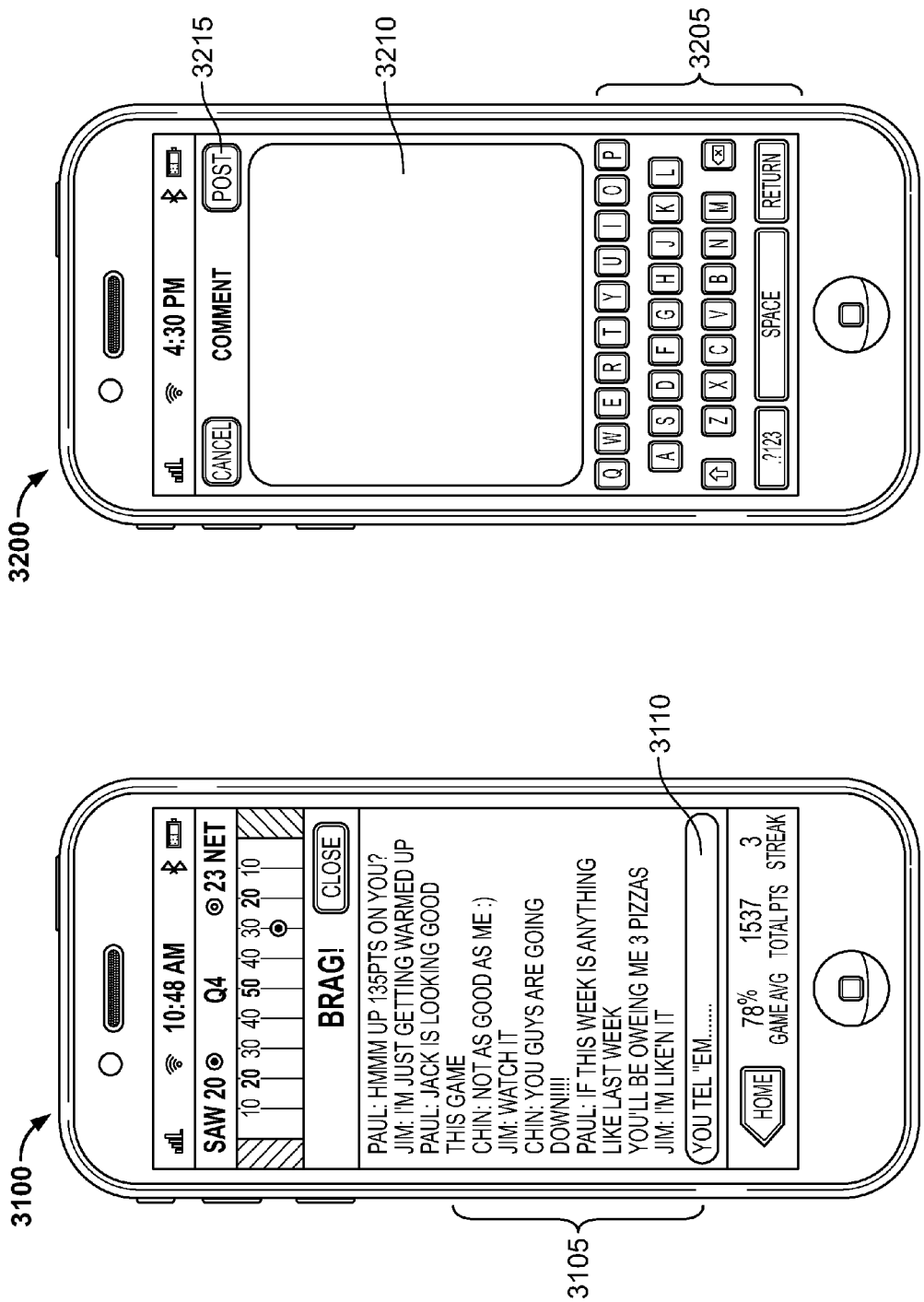

LEADERBOARD

3300

| | NAME | TEAM | POINTS | PRED % | # PRED | AVG. PTS/PRED. |
|---|---|---|---|---|---|---|
| 1. ☐ | MAC ROOSWELL | DRAGS | 135 | 68% | 123 | 12 |
| 2. ☐ | GIM HALL | BOOZERS | 132 | 65% | 108 | 10 |
| 3. ☐ | GEORGE | BRICKS | 128 | 60% | 92 | 10 |
| 4. ☐ | TEENAX | CANNONS | 124 | 68% | 50 | 8 |
| 5. ☐ | TIN TIN | TWISTERS | 122 | 65% | 78 | 9 |

SEASON / WEEK / 1 2 3 4 5 6 7 > / OVERALL / TEAM / POINTS / PREDICT

*FIG. 33*

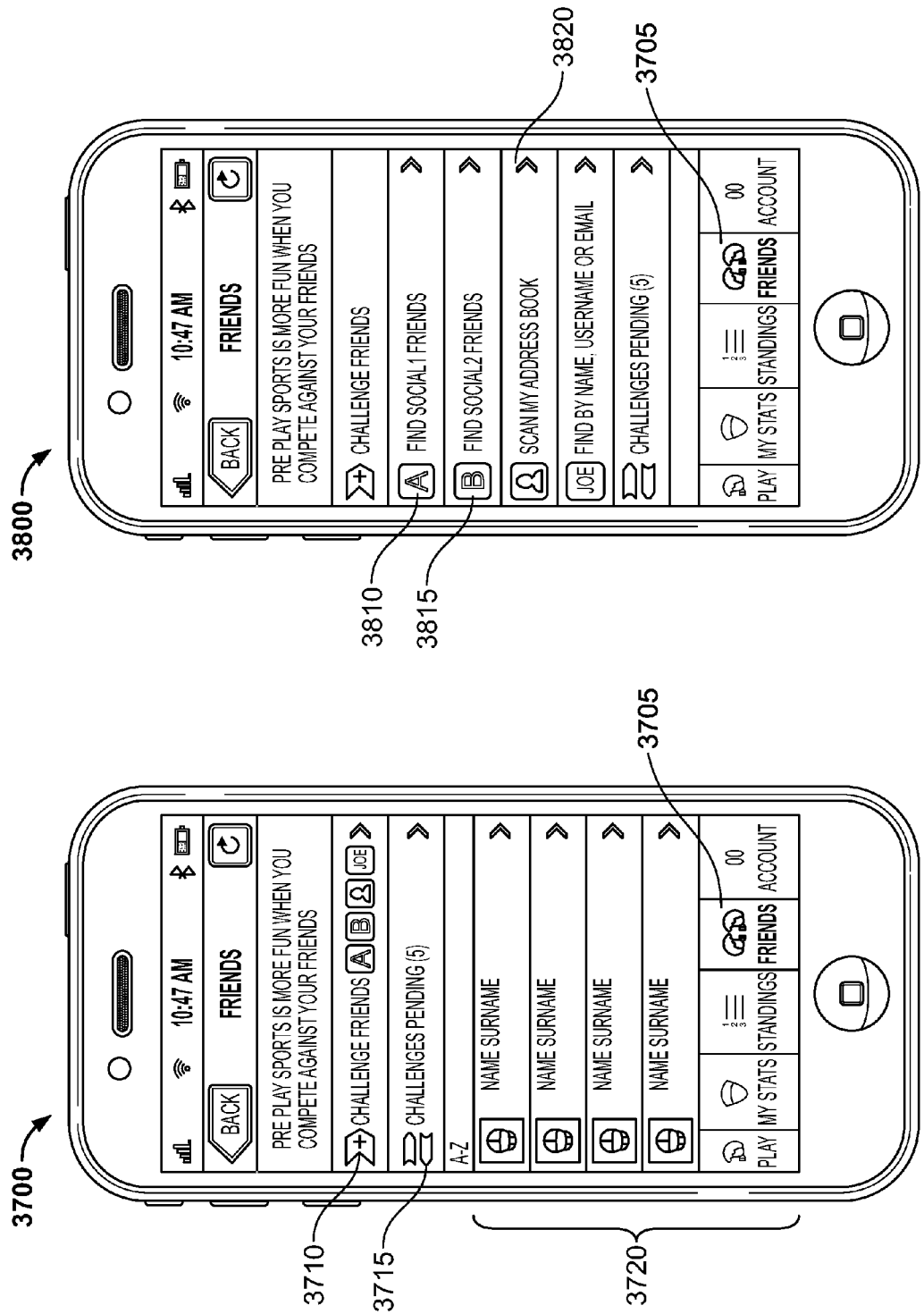

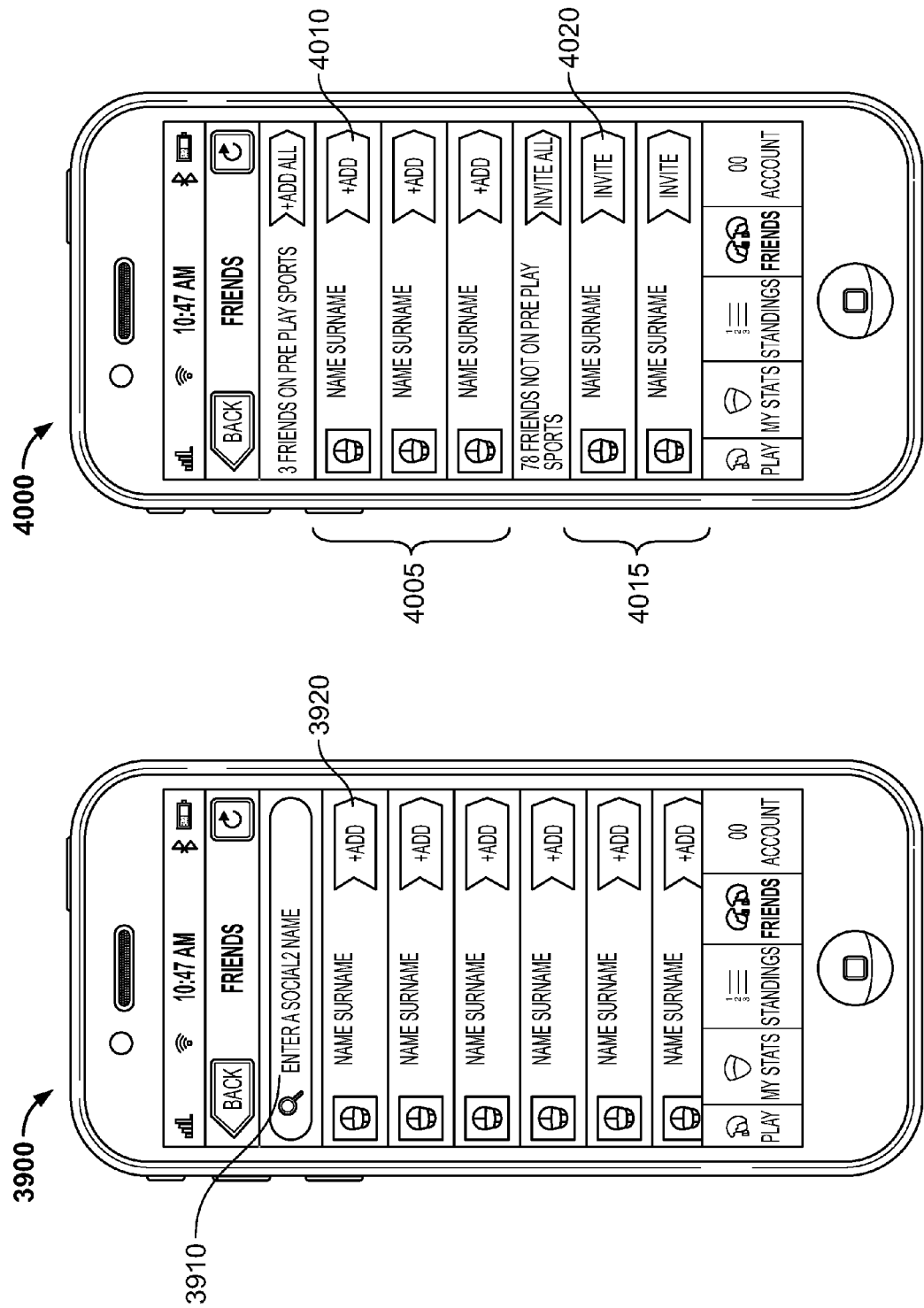

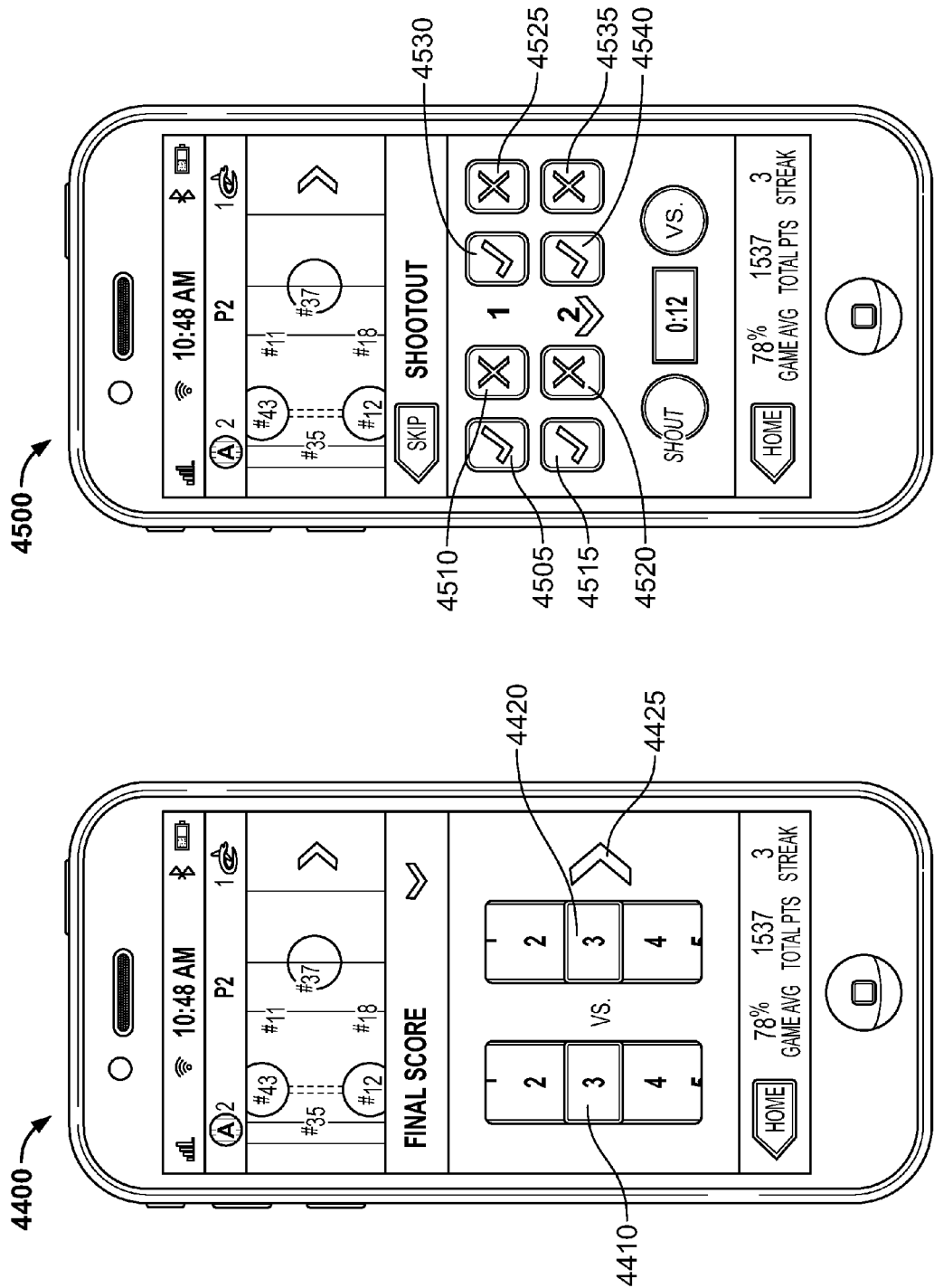

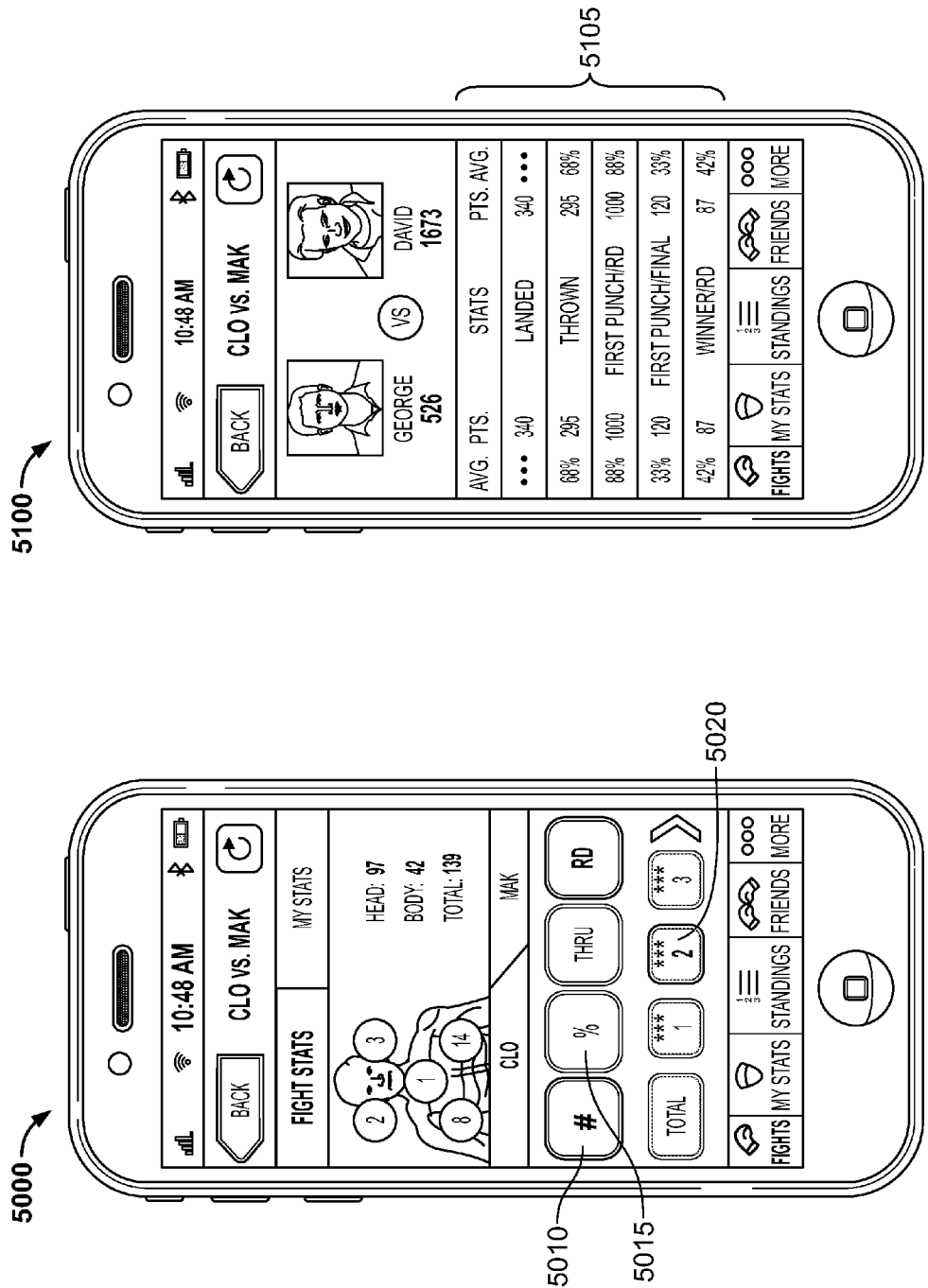

SYSTEMS AND METHODS FOR SCORING COMPETITIVE STRATEGY PREDICTIONS OF USERS ON A PLAY-BY-PLAY BASIS

RELATED APPLICATIONS

The present application claims priority to U.S. Provisional Application No. 61/394,010, entitled "Systems and Methods for Scoring Competitive Strategy Predictions of Users on a Play-by-Play Basis" and filed Oct. 18, 2010, the contents of which are hereby incorporated by reference in their entirety.

BACKGROUND

Competitive strategy prediction competitions are generally directed to individual metrics gathered at predetermined times throughout the sporting season. For example, in fantasy leagues, individuals may create hypothetical teams and accrue points based on the selected athletes' performance throughout the season.

SUMMARY

In one aspect, the present disclosure describes a method that may include receiving, by a first computing device, an identity of an event that has occurred in a sporting competition, the sporting competition comprising a plurality of events. The method may include determining, by a processor of the first computing device, a probability that the event would occur. The method may include determining, by the processor of the first computing device, a number of points based at least in part on the probability that the event would occur. The method may include receiving, by the first computing device, a prediction of an event from a second computing device in communication with the first computing device. The method may include increasing, by the processor of the first computing device, a score of a user of the second computing device by the number of points if the prediction of the event matches the identity of the event.

The sporting competition may include at least one sporting competition from a set including a football game, a baseball game, an ice hockey game, a boxing match, a tennis game, a golf game, a motor sporting competition, a martial arts competition, an automotive racing competition, a basketball game, a cricket game, a rugby game, or a horse race. The football game may include at least one of an American football game or a soccer game.

Determining the probability that the event would occur may include identifying past events similar to the event that has occurred and determining the probability based on the past events. Identifying past events similar to the event that has occurred may include identifying past events based at least in part on a team, a number of a down in a football game, an identity of a quarterback, a score differential between the teams, an amount of time remaining in a competition, and a season record for the team. Identifying past events similar to the event that has occurred may include identifying past events based at least in part on a score differential between teams, a period of time within a competition, a location of the competition, an identity of a pitcher, an identity of a batter, a number of outs in an inning, and a position of a runner on a base. Determining the number of points may include determining the number of points based at least in part on an inverse relationship with the probability that the event would occur. Determining the number of points may include subtracting the probability from 100.

The method may include decreasing the score of the user when the prediction of the event does not match the identity of the event. The method may include determining the prediction of an event is null when a predetermined period of time elapses.

In one aspect, the present disclosure describes an apparatus. The apparatus may include a processor and a memory. The memory may store instructions that, when executed by the processor, cause the processor to receive an identity of an event that has occurred in a sporting competition, the sporting competition comprising a plurality of events; determine a probability that the event would occur; determine a number of points based at least in part on the probability that the event would occur; receive a prediction of an event from a computing device; and increase a score of a user of the computing device by the number of points if the prediction of the event matches the identity of the event.

The memory may store instructions that, when executed by the processor, cause the processor to identify past events similar to the event that has occurred and determine the probability based on the past events. The memory may store instructions that, when executed by the processor, cause the processor to identify past events based at least in part on a team, a number of a down in a football game, an identity of a quarterback, a score differential between the teams, an amount of time remaining in a competition, and a season record for the team. The memory may store instructions that, when executed by the processor, cause the processor to identify past events based at least in part on a score differential between teams, a period of time within a competition, a location of the competition, an identity of a pitcher, an identity of a batter, a number of outs in an inning, and a position of a runner on a base.

The memory may store instructions that, when executed by the processor, cause the processor to determine the number of points based at least in part on an inverse relationship with the probability that the event would occur. The memory may store instructions that, when executed by the processor, cause the processor to subtract the probability from 100.

The memory may store instructions that, when executed by the processor, cause the processor to decrease the score of the user when the prediction of the event does not match the identity of the event. The memory may store instructions that, when executed by the processor, cause the processor to determine the prediction of an event is null when a predetermined period of time elapses.

BRIEF DESCRIPTION OF THE FIGURES

The foregoing and other objects, aspects, features, and advantages of the present disclosure will become more apparent and better understood by referring to the following description taken in conjunction with the accompanying drawings, in which:

FIG. 2 is an exemplary user interface for accessing an application related to a competitive strategy prediction service;

FIGS. 3 and 4 are exemplary user interfaces for signing into an application related to a competitive strategy prediction service;

FIG. 7 is an exemplary user interface with a menu of functions;

FIGS. 8 and 9 are exemplary user interfaces for viewing information about upcoming competitions;

FIGS. 10-12 are exemplary user interfaces for viewing information about recent competitions;

FIG. 16 is an exemplary user interface depicting past events for a competition;

FIGS. 17-25 are exemplary user interfaces with potential plays for a competition;

FIGS. 26-30 are exemplary user interfaces used in the course of making a prediction for a play in a competition;

FIGS. 31-32 are exemplary user interfaces for communicating between users during a competition;

FIGS. 33-36 are exemplary user interfaces for displaying statistics regarding users;

FIGS. 37-40 are exemplary user interfaces for adding contacts to the competitive strategy prediction service;

FIG. 44 is an exemplary user interface used in the course of making a prediction for an outcome of a sporting competition;

FIGS. 45-47 are exemplary user interfaces used in the course of making a prediction for a play in a competition;

FIG. 50 is an exemplary user interface for displaying statistics about a boxing match; and FIG. 51 is an exemplary user interface for comparing statistics between two users who made predictions for a boxing match.

Figure 1:
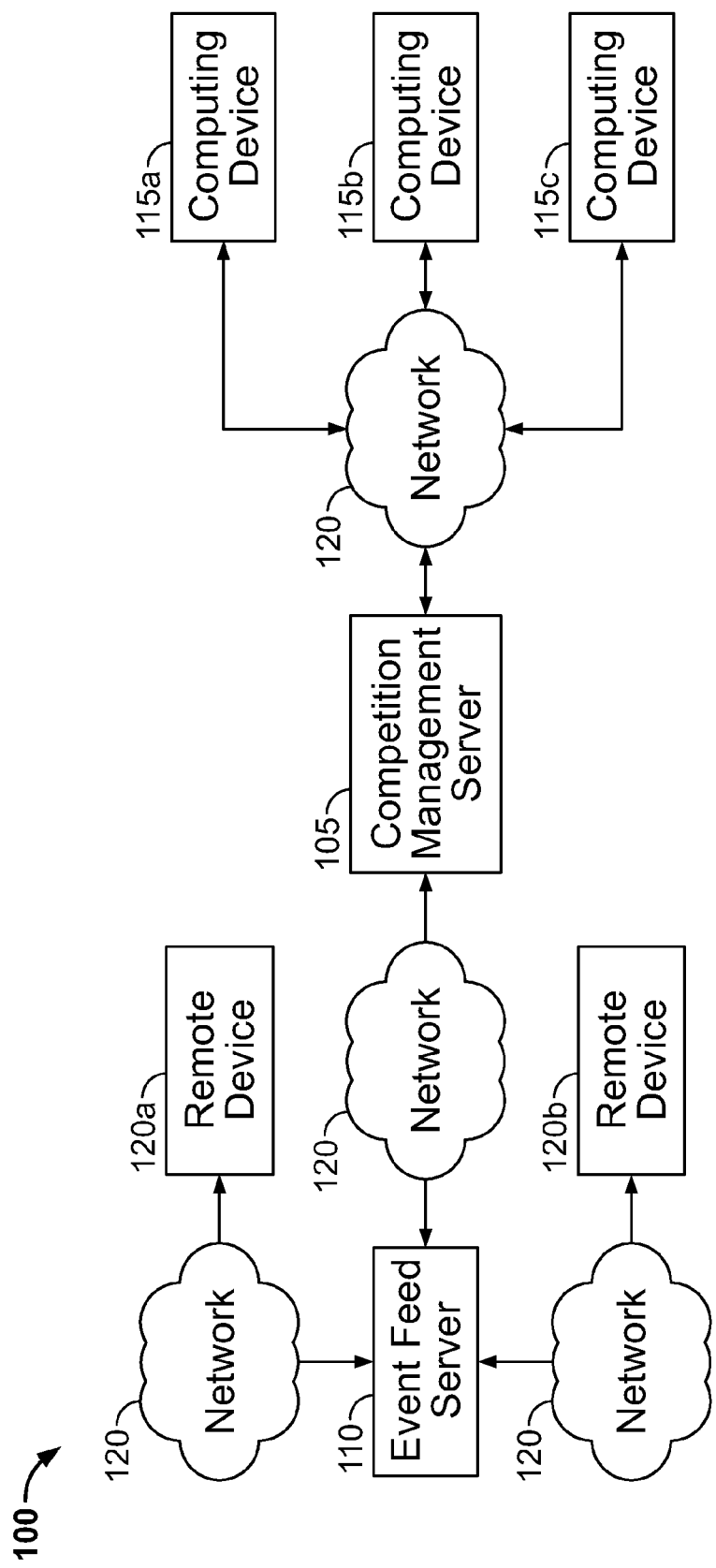
FIG. 1 is a block diagram of an exemplary network environment 100 for scoring competitive strategy predictions of users on a play-by-play.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In some implementations, the present disclosure may be directed to a system and method for scoring competitive strategy predictions of users on a play-by-play basis. A competitive strategy prediction service may manage user accounts. A user may select a sporting competition in progress and view events (also referred to herein as "plays") that have already occurred. The user may select an event from a plurality of potential events presented by the competitive strategy service to make a prediction. The service may update the user's prediction score based on a comparison between the user's prediction and the actual event. The server may update the user's prediction score based on a comparison between the user's prediction, the actual event, and other users' predictions. The user may belong to one or more groups (e.g., leagues) in which the user competes against other users based on their prediction scores.

The present disclosure may include a method for scoring competitive strategy predictions of users on a play-by-play basis. The method may include requesting in real-time, by a processor on a first computing device, an identity of an event for a sporting competition comprising a plurality of events. The method may include receiving, by the first computing device, the identity of the event. The method may include transmitting, by the first computing device, a plurality of predictions for the event to a second computing device, the plurality of predictions including the identity of the event received. The method may include receiving, by the first computing device, a selection from the plurality of predictions from the second computing device. The method may include updating, by the first computing device, a score of a user of the second computing device based on a comparison of the selection and the identity of the event.

In some implementations, the systems and methods of the present disclosure may be applied to any sporting competition. Exemplary sporting competitions may include football games (e.g., American Football games such as the National Football League (NFL) games, or soccer games), baseball games, ice hockey games, boxing matches, tennis matches, golf games, motor sporting competitions, automotive racing competitions (e.g., competitions organized by the National Association for Stock Car Auto Racing (NASCAR), martial arts competitions (e.g., competitions organized by Ultimate Fighting Championship (UFC)), wrestling competitions, basketball games, cricket games, rugby games, Olympic games and events, and/or horse races. In some implementations, sporting competitions may include professional sporting competitions. In other implementations, sporting competitions may include collegiate sporting competitions or amateur sporting competitions.

Referring now to FIG. 1, an implementation of a network environment 100 for scoring competitive strategy predictions of users on a play-by-play basis is shown and described. In brief overview, the network environment includes a computing device such as competition management server 105 that provides a competitive strategy prediction service and that may include a memory (not shown), a computing device such as an event feed server 110, and a plurality of computing devices such as user computing devices 115a-n. The network environment 100 may include remote devices 120, 120b in communication with the event feed server 110. The competition management server 105, event feed server 110, user computing devices 115a-n, and/or remote devices 120 may communicate over one or more networks 120.

The event feed server 110 may include information regarding events regarding sporting competitions (e.g., "plays"). In some implementations, an event feed server 110 may aggregate information about plays in on-going sporting competitions from various sources, such as remote devices 120a, 120b. In some implementations, attendees at the sporting competitions may have the remote devices 120. Each attendee may input information about the sporting competition into a remote device 120. For example, an attendee may input the starting line-up for each baseball team at a baseball competition. The attendee may input the starting pitcher. The attendee may input information about a player substitution in the competition.

In some implementations, an attendee may input information about plays of a competition into a remote device 120. For example, the attendee may input that a player on a football team fumbled, resulting in an incomplete pass. For example, the attendee may input that a boxer knocked out his opponent. The remote device 120 may send the information to the event feed server 110. The event feed server 110 may store the information and/or index the information based on the identity of the sporting competition.

The event feed server 110 may send information about the sporting competitions to the competition management server 105. In some implementations, the competition management server 105 may send information received from the event feed server 110 to the user computing devices 115. In some implementations, the competition management server 105 may directly pass information from the event feed server 110 to the user computing devices 115. For example, the competition management server 105 may identify user computing devices 115 on which users are following a current sporting competition, such as a football competition between Team A and Team B. When the competition management server 105 receives information from the event feed server 110 about the football competition between Team A and Team B, the server 105 may directly pass the information to the user computing devices 115 with users who are following that competition. In some implementations, the server 105 may send the information via a JavaScript Object Notation (JSON) or Extensible Markup Language (XML) application programming interface (API).

In some implementations, a user account for the competitive strategy prediction service may include a subscription for information related to a topic, such as American football teams in the National Football League. The user computing device 115 through which the user account accesses the competitive strategy prediction service may maintain a connection with the competition management server 105. In some implementations, the connection may include a data channel. The data channel may be centralized. In some implementations, the user computing device 115 may have substantially continuous communication with the data channel via a persisted open connection. The data channel may be associated with information related to the topic. When the competition management server 105 receives information related to the topic, the server 105 may send the information to the data channel (e.g., publish the information to the data channel). In some implementations, the user computing device 115 may access the data channel via a subscription, by way of example. The device 115 may access information published to the data channel.

The competition management server 105 may store information received from the event feed server 110. In some implementations, the competition management server 105 may process the information. In some implementations, processing the information may update statistics relating to athletes or sporting competitions. For example, when the event feed server 110 sends information on an event, such as a pitcher striking out a batter, the competition management server 105 may retrieve information about the batter's batting average against the pitcher and overall batting average. Based on the batter's strikeout, the competition management server 105 may determine updated batting averages for the batter. The server 105 may overwrite obsolete values for the batting averages in memory with the updated values. In some implementations, the server 105 may send the updated averages to the user computing devices 115.

The competition management server 105 may store accounts for users of the competitive strategy prediction service. In some implementations, an account may include identification information of the user, such as the user's name and account password. In some implementations, an account may include information about the user's friends with accounts for the competitive strategy prediction service, the user's competitive leagues, and/or the user's prediction score(s). In some implementations, an account may include the identities of social networks for which the user has accounts. In some implementations, the account may include authentication and/or credentials for the social network accounts.

In some implementations, a prediction score may be a number of points that user has accrued by making accurate predictions for sporting competitions (also referred to herein as "prediction point score"). In some implementations, a prediction score may be a percentage of the number of accurate predictions the user has made compared to the user's total number of predictions (also referred to herein as "prediction percentage score"). In many implementations, users may have both prediction point scores and/or prediction accuracy percentage scores. A user may have one cumulative prediction score of each type (e.g., points, percentage). A user may have separate prediction scores of each type for each competitive league the user belongs to (e.g., prediction scores for Friends League A, Acquaintances League B). In some implementations, the user may have separate prediction scores of each type according to the type of sporting competitions the user makes predictions for (e.g., baseball prediction scores, football prediction scores).

In various implementations, an account may include the user's settings. The settings may include a user's preferences for sporting competitions. For example, a user may indicate a preference for football competitions over baseball competitions. Further, the user may indicate a preference for football competitions in the American Football Conference (AFC) over competitions in the National Football Conference (NFC). Additionally, the user may indicate a preference for competitions in the Eastern Division of the AFC over competitions in the other divisions. The user may set preferences for sporting competitions in any manner that would be understood by one of ordinary skill in the art.

In operation, the user may access the competitive strategy prediction service by using a user computing device 115. The user computing device 115 may include an application that connects the user to the competitive strategy prediction service on the competition management server 105. In various implementations, the user may obtain the application by downloading the application from the competitive strategy prediction service's website or a third-party provider of applications, such as the iTunes™ stores. Activating the application may automatically connect the device 115 to the competition management server 105.

In some implementations, activating the application may direct the user to an introductory user interface (UI) 200, such as the exemplary screenshot depicted in FIG. 2. The user interface 200 may include a sign in control 205, a control 210 for creating an account with the competitive strategy prediction service (e.g., a control to join the service), and a control 215 for using the service as a guest.

If a user selects the sign in control 205, the user computing device 115 may display a sign in user interface 300 or 400, such as the exemplary screenshots depicted in FIGS. 3 and 4. The user interfaces 300, 400 may request credentials from the user. For example, the user interfaces 300, 400 may include fields 305, 405 for the user to input a username. For example, the user interfaces 300, 400 may include fields 310, 410 for the user to input a password. In some implementations, a user interface 400 may include a control 415 whose activations sends information (e.g., credentials) inputted into fields 405, 410 to the competition management server 105. In some implementations, the user interface 400 may include a social network login control 420. If the user selects this control 420, the application may redirect the user to the login interface for the social network (not shown). The user may enter credentials for the social network into the login interface, and the credentials may be used to access the user's account for the competition strategy prediction service.

Figure 5:
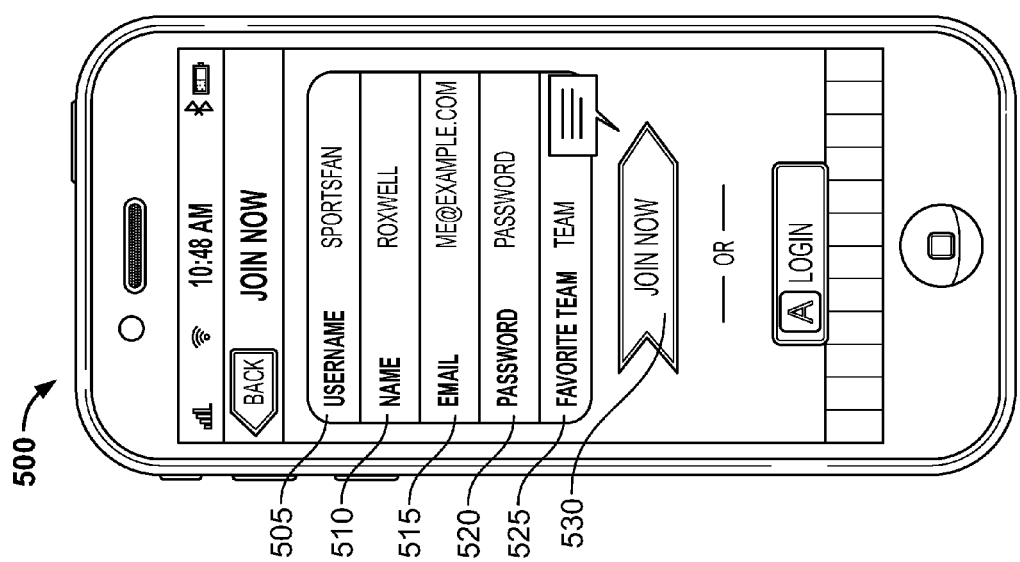
FIG. 5 is an exemplary user interface for creating an account with a competitive strategy prediction service.

If a user selects the control 210 for creating an account with the competition strategy prediction service, the user computing device 115 may display an account creation user interface 500, such as the exemplary screenshots depicted in FIG. 5. The account creation user interface 500 may include fields 505, 510, 515, 520, 525 that may accept the username, name, e-mail address, password, and favorite team of the user. The account creation user interface 500 may include other fields that accept other information for the account. In some implementations, a user interface 500 may include a control 530 whose activations sends the information inputted into fields 505, 510, 515, 520, 525 to the competition management server 105. Upon receipt of the information, the server 105 may create an account with the information provided in the fields 505, 510, 515, 520, 525.

Figure 6:
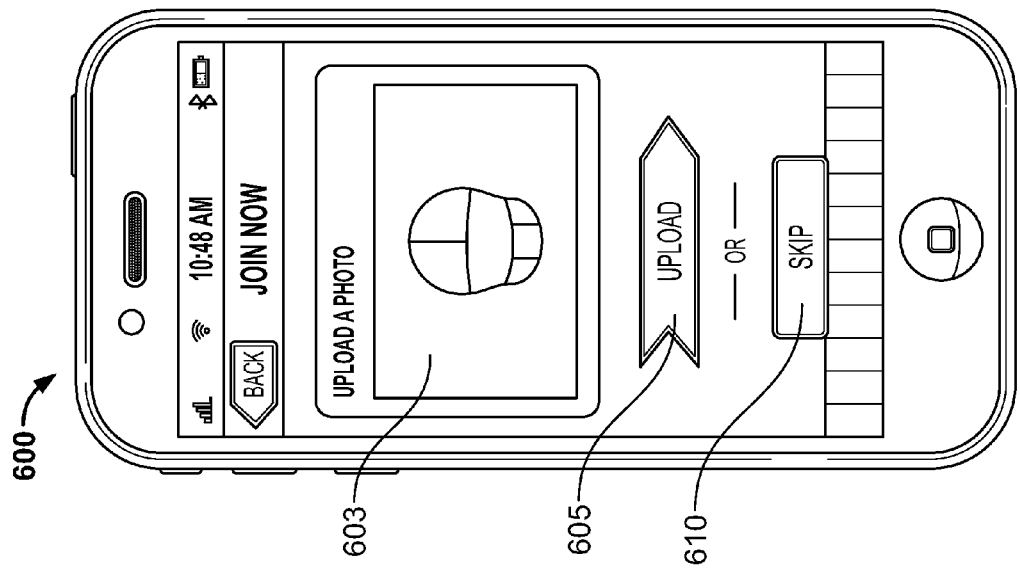
FIG. 6 is an exemplary user interface for submitting an image for an account with a competitive strategy prediction service.

In some implementations, an account creation user interface 600 may permit a user to submit an image to the account, as shown in FIG. 6. In some implementations, the image may appear as an icon or avatar, by way of example, whenever the user accesses the application on the user computing device 115. The user may select an image stored on the user computing device 115. Upon selection, the image may appear in a window 603 on the device 115. The user may select a control 605 to include the image in the account (e.g., upload the image to the account). In some implementations, a user may select a control 610 to forgo including an image in his or her account.

In some implementations, after the user accesses the competitive strategy prediction service, the competition management server 105 may transmit a menu to the user computing device 115, such as the menu in the user interface 700 of FIG. 7. The menu in the user interface 700 may include icons that permit a user to view a list of competitions 705 (e.g., "Play"), access results of competitions previously tracked 710 (e.g., "My Competitions"), view results in competitive leagues 715, view overall standings for users of the service 720, view results for friends using the competitive strategy prediction service 725, change account settings 730, or any other option as would be appreciated by one of ordinary skill in the art. Each of these functionalities may be explained in more detail in the present disclosure.

In some implementations, when the user selects the icon to view competitions 705, the user computing device 115 may display a menu that allows the user to view lists of current, upcoming, and recent competitions, as depicted in the exemplary screenshots 800, 900 of FIGS. 8 and 9. The icon to view competitions 705 may remain visible on the user interfaces 800, 900, 1000. The user may select a tab 805 on the user interface 800 to view a list of upcoming sporting competitions 810. The user interface 800 may include the dates 815 of the upcoming competitions. The user interface 800 may include the start times 820 of the upcoming competitions.

By selecting a competition in a list of upcoming competitions, the user computing device 115 may display a user interface 900 with information about the competition. For example, the information may include the records of the athletic teams (e.g., 3 wins and 1 loss). In some implementations, the user interface 900 may include a control 910 that allows the user to predict which team will win the coin toss. If the user makes an accurate prediction, the competition management server 105 may add points to the user's prediction score.

In some implementations, the user interface 900 may include a control 915 that requests a reminder for the competition. If the user selects the reminder control 915, the service may send the user a reminder regarding the competition. For example, the service may send an e-mail reminder to the user an hour before the competition begins. For example, the service may send a text message reminder to the user an hour before the competition begins. For example, the service may cause the computing device to sound an alarm an hour before the competition begins. Although the reminders described herein occur an hour before the competition begins, any period of time may be used. In some implementations, the service may send multiple reminders to the user prior to the start of the competition.

Referring now to FIG. 10, a user may select a tab 1005 on the user interface 1000 to view a list of recent, completed sporting competitions 1010. The user interface 1000 may include the final results 1015 of the recent, completed competitions. By selecting a competition from the list 1010, the computing device 110 may display a user interface 1100 or 1200 with statistics 1110 or 1210 on the competition, such as the exemplary screenshots 1100 or 1200 of FIGS. 11 and 12. Statistics on a competition, such as an American football game, may include the final score, the number of points scored in each quarter, the yardage for rushing, the yardage for passing, the number of third down conversions, the number of touchdowns, the number of successful field goal attempts, or any other statistic as would be appreciated by one of ordinary skill in the art. In some implementations, the competition management server 105 receives the statistics from the remote devices 120. In some implementations, the competition management server 105 analyzes event information from the remote devices associated with a competition to determine the statistics for the competition.

Figures 13, 14, 15:
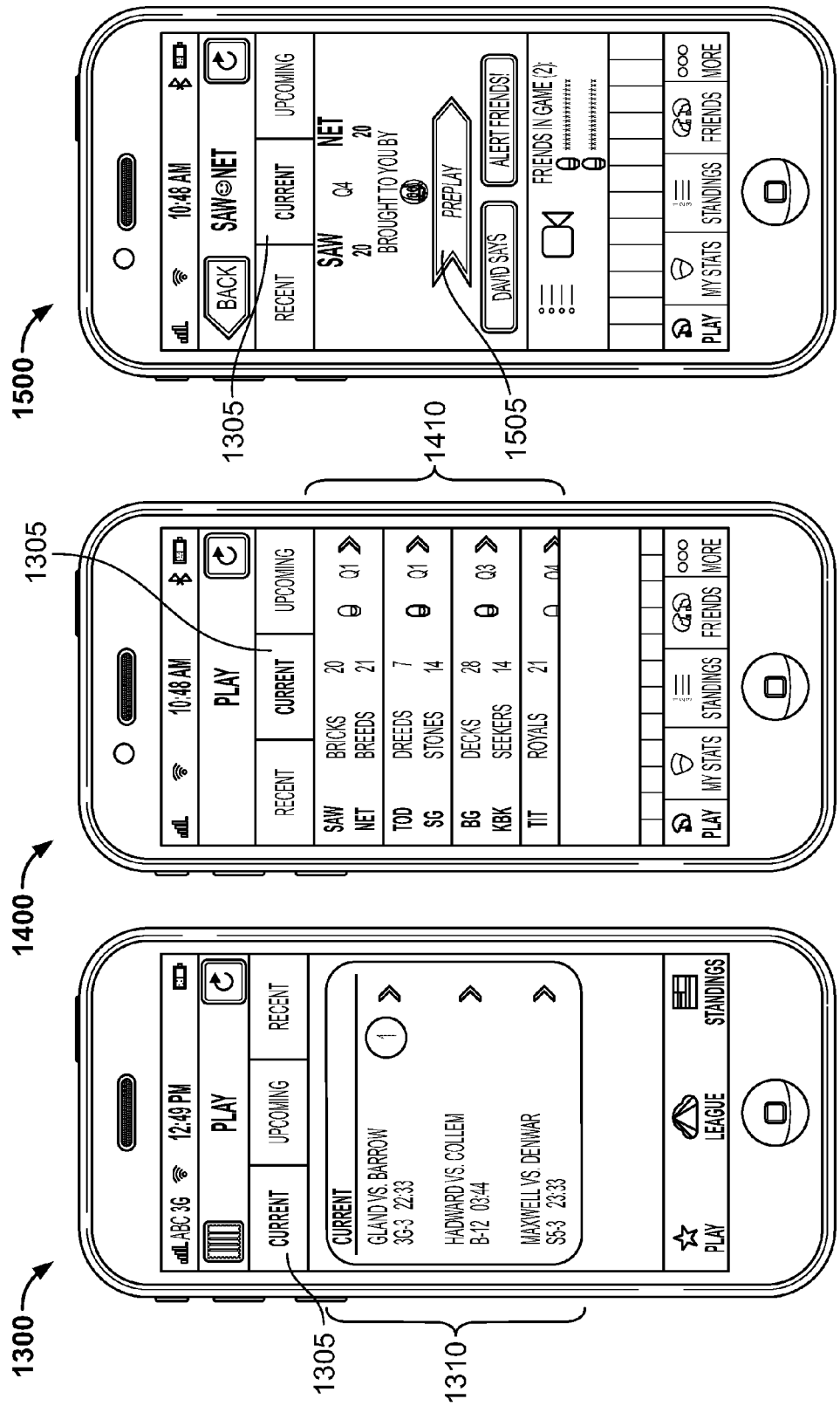
FIGS. 13 and 14 are exemplary user interfaces for viewing information about current competitions.
FIG. 15 is an exemplary user interface for using the competitive strategy service for a competition.

Referring now to FIGS. 13 and 14, exemplary user interfaces 1300, 1400 displayed on an user computing device 115 when the user selects a tab 1305 to view a list of current sporting competitions 1310, 1410 (e.g., sporting competitions that have not concluded) is shown and described. In some implementations, the list of current sporting competitions may identify the teams in the competition, the current score in the competition, and an indication of the amount of time that has elapsed in the competition.

In some implementations, when the user selects the tab 1305 to view a list of current competitions, the competition management server 105 may determine the sporting competitions in progress. The competition management server 105 may transmit a list of the competitions to the user computing device 115 for the user's selection. In some implementations, the competition management server 105 may sort the sporting competitions according to the user account's preferences. For example, based on the account preferences, the competition management server 105 may first present American football competitions in the Eastern Division of the AFC first, followed by American football competitions in other divisions. Then, the server 105 may present the competitions in the NFC or competitions for other sports, e.g. baseball.

In some implementations, the competition management server 105 may transmit multiple lists to the user computing device 115. These lists may separate the different types of sporting competitions, e.g. different lists for baseball competitions and American football competitions. In these implementations, the user may toggle between the lists to view the sporting competitions in progress for different sports.

In some implementations, the user may select a competition from a list of current sporting competitions 1310, 1410. The user computing device 115 may display a user interface

1500 with the identities of the teams in the competition, the current score, and an indication of the amount of time remaining in the competition (e.g., the current quarter, inning), as depicted in FIG. 15. The interface 1500 may include a control 1505 that, when activated, would allow the user to begin using the competitive strategy service for the competition.

The user computing device 115 may transmits the request to user the service for the selected competition to the competition management server 105. The competition management server 105 may retrieve information about the selected competition. In some implementations, the server 105 may retrieve the information from internal memory. In some implementations, the server 105 may retrieve the information from an external memory.

The server 105 may retrieve, by way of example, information on the starting line-up for each team and the status of the competition (e.g., no score, 13 minutes and 6 seconds left in the first quarter, $3^{rd}$ down, 4 yards to $1^{st}$ down, 27 yards to the end zone). The competition management server 105 may also provide the plays that have occurred, such as the exemplary plays listed in FIG. 16. The competition management server 105 may forward this information to the user computing device 115. The device 115 may display any of the information from the server 105 to the user. In particular, the device 115 may display the plays that have already occurred in a competition in exemplary screenshots such as the screenshots 1600 of FIG. 16. In various implementations, if the user is following multiple competitions, the user computing device 115 may permit the user to toggle between screenshots with the plays for the selected competitions.

Based on the status of the competition, the competition management server 105 may identify potential plays. For example, in an American football competition, the server 105 may identify potential plays based on the number of the down, the number of yards to go, the amount of time left in the competition, the field positions of the team, the score of the competition, or any other factor. In another example, in a baseball competition, the server 105 may identify potential plays based on the number of the inning, the number of outs, and/or the number and positions of players on base.

In some implementations, the competition management server 105 may store predetermined sets of potential plays according to the values of any combination of the above factors. For example, the server 105 may store a predetermined set of potential plays to be presented on every first down in an American football game. For example, the server 105 may store a predetermined set of potential plays to be presented whenever a football team is within 10 yards of the end zone. For example, the server 105 may store a predetermined set of potential plays to be presented in a baseball game whenever a runner is on second base in an inning with two outs. For example, the server 105 may store a predetermined set of potential plays to be presented in a baseball game whenever a runner is on first base in an inning with one out.

Referring now to FIGS. 17-25, screenshots of user interfaces with exemplary potential plays for an American football game are shown and described. With reference to FIG. 17, a user interface 1700 may display six potential plays when a team is on the 30-yard line with a first down. In this implementation, the user interface 1700 may include an icon corresponding to a prediction that the team will run the football for more than five (5) yards 1705, an icon corresponding to a prediction that the team will run the football for less than five (5) yards 1710, an icon corresponding to a prediction that the team will pass the football for more than ten (10) yards 1715, an icon corresponding to a prediction that the team will pass the football for less than ten (10) yards 1720, an icon corresponding to a prediction that the team will score a touchdown 1725, and an icon corresponding to a prediction that the opposing team will intercept the football 1730.

With reference to FIG. 18, a user interface 1800 may display four potential plays when a team is on the 30-yard line with a second down and seven yards to go. In this implementation, the user interface 1800 may include an icon corresponding to a prediction that the team will run the football 1805, an icon corresponding to a prediction that the team will pass the football 1810, an icon corresponding to a prediction that the team will score a touchdown 1815, and an icon corresponding to a prediction that the team will score a field goal 1820.

With reference to FIG. 19, a user interface 1900 may display two potential plays when a team is on the 30-yard line with a third down and eight yards to go. In this implementation, the user interface 1900 may include an icon corresponding to a prediction that the team will achieve a first down 1905 and an icon corresponding to a prediction that the team will be held 1910.

With reference to FIG. 20, a user interface 2000 may display five potential plays when a team is on the 30-yard line with a fourth down and seven yards to go. In this implementation, the user interface 2000 may include an icon corresponding to a prediction that the team will punt 2005, an icon corresponding to a prediction that the team will achieve a first down 2010, an icon corresponding to a prediction that the team will be held 2015, an icon corresponding to a prediction that the team will score a touchdown 2020, and an icon corresponding to a prediction that the team will score a field goal 2025.

With reference to FIG. 21, a user interface 2100 may display two potential plays when a team attempts a field goal. In this implementation, the user interface 2100 may include an icon corresponding to a prediction that the team will score the field goal 2105 and an icon corresponding to a prediction that the team will miss the field goal 2110.

With reference to FIG. 22, a user interface 2200 may display four potential plays after a team has scored a touchdown. In this implementation, the user interface 2200 may include an icon corresponding to a prediction that the team will score an extra point via a field goal 2205, an icon corresponding to a prediction that the team will fail to obtain an extra point by missing the field goal 2210, an icon corresponding to a prediction that the team will make a successful two-point conversion 2215, and an icon corresponding to a prediction that the team will fail to make a two-point conversion 2220.

With reference to FIG. 23, a user interface 2300 may display a slider 2305 a user may manipulate for a prediction about the position a football team will acquire on a kick return. The user may move the slider 2305 to a position corresponding to the prediction (e.g., the 20-yard line).

With reference to FIG. 24, a user interface 2400 may display a slider 2405 a user may manipulate for a prediction about the position a football team will acquire on a punt return. The user may move the slider 2405 to a position corresponding to the prediction (e.g., the 35-yard line).

Figure 25:
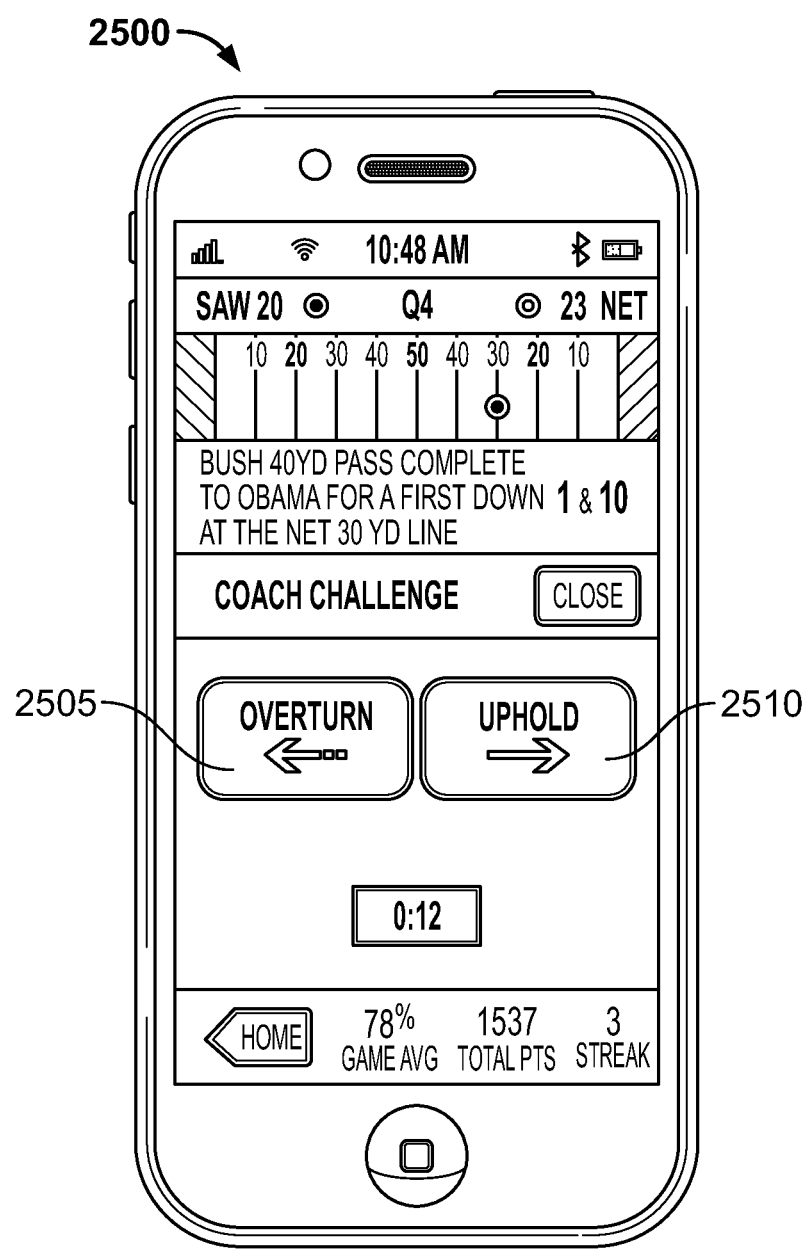

With reference to FIG. 25, a user interface 2500 may display two predictions when a coach challenges a decision in the competition. In this implementation, the user interface 2500 may include an icon corresponding to a prediction that the decision will be overturned 2505 and an icon corresponding to a prediction that the decision will be upheld 2510.

Referring now to FIGS. 26-31, screenshots of user interfaces used in the course of making a prediction for a play in a sporting competition are shown and described. With reference to FIG. 26, the competition management server 105 may transmit the potential plays for display on the user computing device 115. The user computing device 115 may display the potential plays according to, for example, icons 2605, 2610, 2615, 2620, 2625, 2630, 2635, 2640 on the user interface 2600 shown in FIG. 26. In some implementations, the user interface 2600 may include a timer 2645 that may allot a predetermined period of time for the user to select a play (e.g., 15 seconds).

With reference to FIG. 27, a user interface 2700 in which a user has eliminated all but two potential plays is depicted. In this implementation, an icon corresponding to a prediction that the team will complete a pass longer than 10 yards 2705 and an icon corresponding to a prediction that the team will score a touchdown 2710 remain active. The potential plays that the user has eliminated from consideration may be grayed out. In some implementations, the user may eliminate a potential play according to a predetermined control. For example, the user may double tap an icon corresponding to a potential play to gray out the icon. For example, the user may swipe upwards along the icon to eliminate the potential play.

In some implementations, the user may select an icon corresponding to a potential play. The user may change the selected play before the period of time elapses, after which the user computing device 115 transmits the user's selection to the competition management server 105. In some implementations, if the user has not selected a potential play at this time, the user computing device 115 registers the lack of selection with the competition management server 105.

Figure 28:
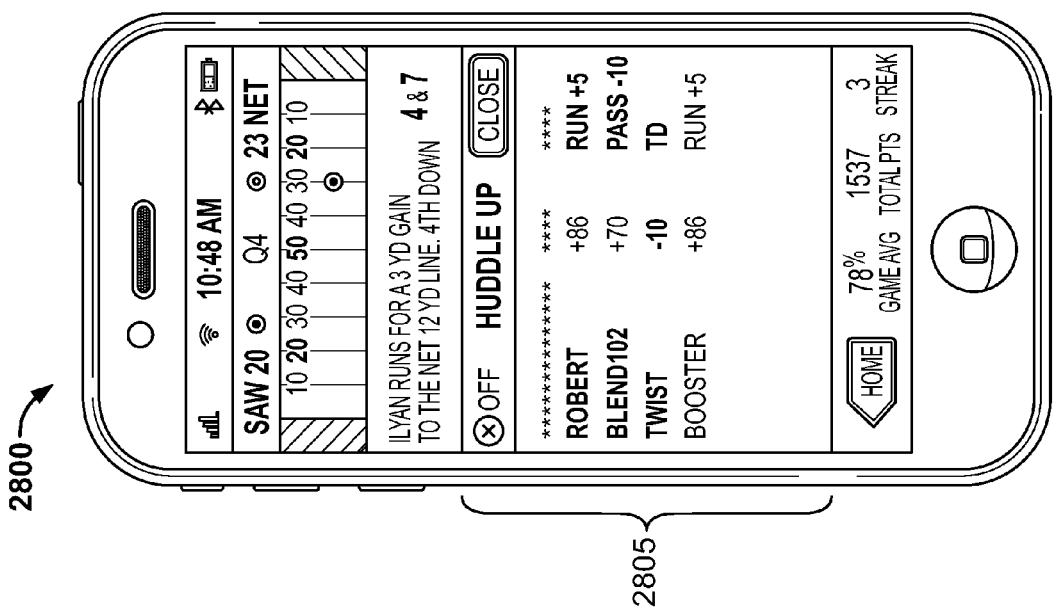

With reference to FIG. 28, a user interface 2800 may depict the predictions 2805 the user and the user's competitors (e.g., friends, competitors in a league) have selected. In some implementations, the user computing device 115 may depict such an interface 2800 after the period of time for making predictions has elapsed. In some implementations, the competition management server 105 may receive the predictions from users in a group (e.g., network of friends, competitive league). The server 105 may broadcast the predictions of the users to each member of the group.

In operation, the competition management server 105 may continually ping the event feed server 110 to determine if another play has occurred in the competition. In some implementations, the competition management server 105 begins communication with the event feed server 110 upon receipt of the user's selection. In other implementations, the competition management server 105 continually pings the event feed server 110 regardless of the detection of a user selection.

In some implementations, the event feed server 110 may send information about each event (e.g., play) as the information becomes available. When the event feed server sends the information, the competition management server 105 may not ping the event feed server 110 for information.

When the play becomes available, the competition management server 105 may determine the number of points to award users who correctly predicted the play. The server 105 may base the number of points on the probability of the play occur. The competition management server 105 may calculate the probability of the potential play according to, inter alia, the status of the competition. For example, regardless of the amount of time left in a football competition, if the offensive team finds itself 30 yards from its own goal posts, the competition management server 105 may calculate a high probability that the next play will be a punt. In another example, if there are 2 minutes left in the last quarter of a football competition, the offensive team is 4 yards from the end zone, the score is 24-17 in favor of the defensive team, and the play is the $2^{nd}$ down, the competition management server 105 may calculate a higher probability that the next play will result in a touchdown. In further examples, if a baseball competition is in the bottom of the eighth inning and the team at-bat has no outs, a runner at first base, and a tied competition, the competition management server 105 may calculate a high probability for the next play to be a bunt. Likewise, if such a competition had one out and a runner at second base, the server 105 may calculate a high probability for the next play to be a sacrifice fly.

The server 105 may calculate the probabilities according to any probabilistic model applicable to events. For example, the server 105 may statistically analyze plays from a database of past football or baseball competitions (or any other type of sporting competition) to determine the probabilities of the play. In some implementations, the server 105 may identify past events according to the team, the number of the down, the identity of the quarterback, the score differential between the teams, the amount of time remaining in the competition, the season record for the team, or any other factor in any combination. From the identified events, the server may calculate a probability that the team would make the actual play.

For example, a user may be following an American football game between Team A and Team B in the playoffs. Team A may have scored eight fewer points than Team B. Team A's primary quarterback may be injured, and the coach may have included a secondary quarterback in the primary quarterback's place. Team A may be 25 yards from the end zone, with a second down and 7 yards until a first down. There may be four minutes and thirty-two seconds remaining in the fourth quarter. In some implementations, the competition management server 105 may identify all plays in the past 10 years when Team A trailed another team by less than 10 points in the final quarter of a game. Of these plays, the competition management server 105 may identify plays that occurred within 30 yards of the end zone, plays that occurred with a secondary quarterback, plays that occurred on a second down, or any combination thereof. The competition management server 105 may determine the probabilities regarding plays that may occur.

In another example, a user may be following a baseball game between Team A and Team B during the regular season. The game may be occurring in Team B's stadium. The game may be in the bottom of the $7^{th}$ inning There may be a runner at first base, and one out in the inning. Reliever R may be on the mound. Batter BB may be at bat. Team B may be trailing Team A by one run. In some implementations, the competition management server 105 may identify all plays in the past 25 years when Team B trailed another team by three or fewer runs in the seventh, $8^{th}$, or $9^{th}$ inning. Of these plays, the competition management server 105 may identify plays that occurred at Team B's stadium, with Reliever R on the mound, Batter BB at bat, one out in the inning, a runner at first base, or any combination thereof The competition management server 105 may determine the probabilities regarding plays that may occur.

Further, from these probabilities, the competition management server 105 may assign point values to the plays. In some implementations, the lower the probability that a play will occur, the more points the server 105 may assign to the potential play. In some implementations, the number of points may be the difference between 100 and the probability the play would occur (e.g., a play with a 14% chance of occurring would be assigned a point value of 86). Relating the probability of a play with the point value would provide greater rewards to users for correctly predicting unlikely and/or risky plays.

The competition management server 105 may compare the identity of the actual play with the play selected by the user.

The competition management server 105 may update the prediction point score and/or the prediction percentage score of the user based upon the comparison. If the user did not make a selection before the period of time elapsed or before the event feed server 110 transmitted the identity of the next play to the competition management server 105 before the user could make a selection, the user's prediction scores may remain the same. If the user incorrectly predicted the play, the competition management server 105 may deduct points from the user's prediction point score. The number of points deducted may be a constant, predetermined number, e.g. 10 points. In some implementations, the competition management server 105 may leave the user's prediction point score unchanged in response to an incorrect prediction. The server 105 may also adjust the user's prediction percentage score. If the user correctly predicted the play, the server 105 may add the number of points corresponding to the play to the user's prediction point score. Additionally, the server 105 may update the user's prediction percentage score.

In some implementations, the server 105 may update the user's prediction score based on a comparison between the user's prediction, the actual event, and other users' predictions. For example, the server 105 may increase the user's prediction score by an additional amount if the user is the only member of a group (e.g., a competitive league) to make an accurate prediction of the play. For example, the server 105 may increase the user's prediction score by an extra ten points. In some examples, the server 105 may divide the number of points awarded for making a correct prediction among the users who made the correct prediction. For example, suppose a play had an 80% chance of occurring. In some implementations, the server 105 would award 20 points for an accurate prediction of the play. If four users in a competitive league correctly predicted the play, the server 105 may divide the 20 points among the four users to award each user 5 points.

In various implementations, the user computing device 115 updates the user's prediction scores. In these implementations, after the competition management server 105 transmits the identity of the actual play received from the events feed server 110, the competition management server 105 recalculates the probabilities and corresponding point values of the potential plays. The server 105 transmits the point values to the user computing device 115. When the server 105 transmits the identity of an actual play, the user computing device 115 compares the actual play with the user's selected prediction and updates the user's prediction scores accordingly.

Figure 29:
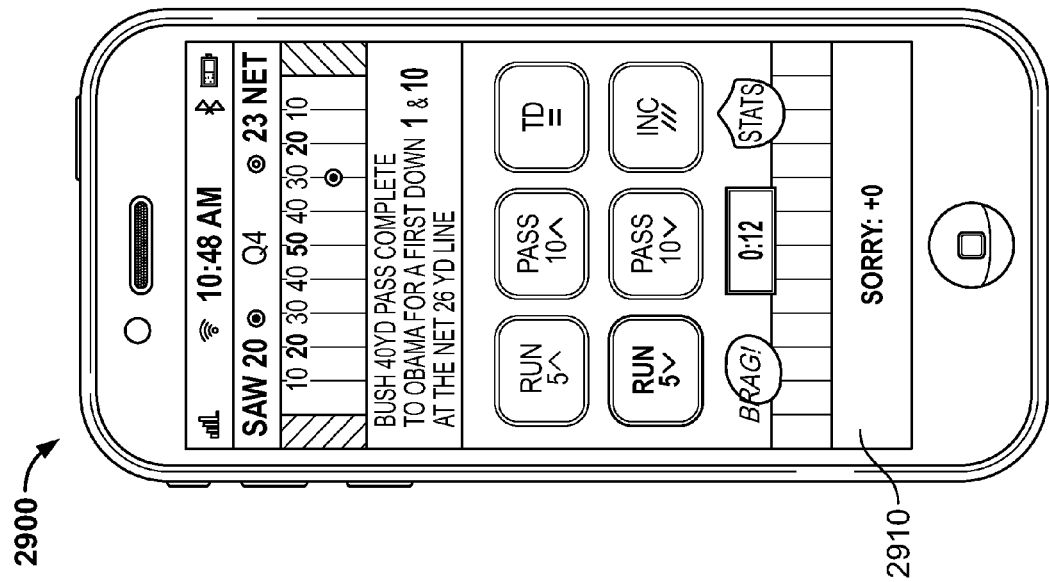
Figure 30:
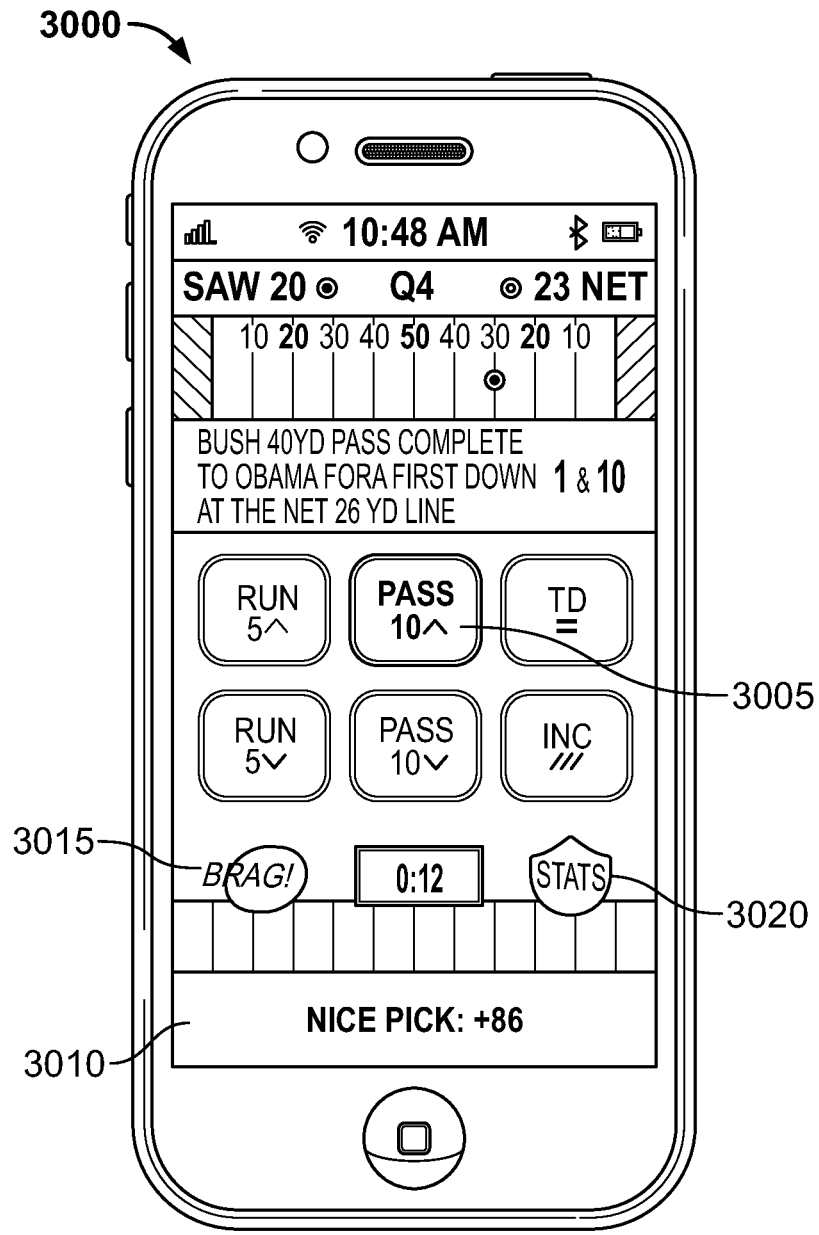

With reference to FIG. 29, a user interface 2900 with a window 2910 informing the user that his or her prediction was incorrect is shown. With reference to FIG. 30, a user interface 3000 with a window 3010 informing the user that his or her prediction was correct is shown. The window 3010 may include the number of points to be added to the user's prediction score as a result of the correct prediction. In some implementations, the user's selected prediction for the play 3005 may remain highlighted. The user interface 3000 may include a control 3015 that enables real-time communication with other users of the service. The user interface 300 may include a control 3020 that permits access to statistics regarding various metrics of users of the service.

Referring now to FIG. 31, a user interface 3100 for communication with other users may be displayed upon selection of the communication control 3015, by way of example. The interface 3100 may include a window 3105 that displays comments. In some implementations, the window 3105 may display comments by friends following the same game, according to an account setting. In some implementations, the window 3105 may display comments by users in the same competitive league who are following the same game, according to an account setting. The user interface 3100 may include a control 3110 for the user to input a comment. Selection of the control 3110 may retrieve the computing device's input interface 3200, as depicted in FIG. 32. The input interface may include a keypad 3205, a window for displaying inputted text 3210, and a submission control 3215. Upon selection of the submission control 3215, the text inputted into the window 3210 may be transmitted to the competition management server 105. The server 105 may broadcast the text to all user computing devices 115 associated with users following the same game in the same grouping as the user (e.g., friends, competitive league).

In some embodiments, then the sporting competition ends, the competition management server 105 may transmit a message indicating the competition's end to the user computing device 115. If the user computing device 115 is tracking the user's prediction score(s), the device 115 may transmit the user's updated scores to the competition management server 105, where the server 105 stores the scores in the user's account. In some implementations, after a competition ends, the user computing device 115 may retrieve updated prediction scores of other users in the user's competition leagues from the competition management server 105. The user computing device 115 may display updated standings for members of competitive leagues based on the updated scores, as in the exemplary screenshot of FIG. 33. In various implementations, the mobile computer device 115 may return the user to a main menu after a competition ends, and from that main menu, the user may select an icon to view updated standings for users in competitive leagues.

Figures 34, 35:
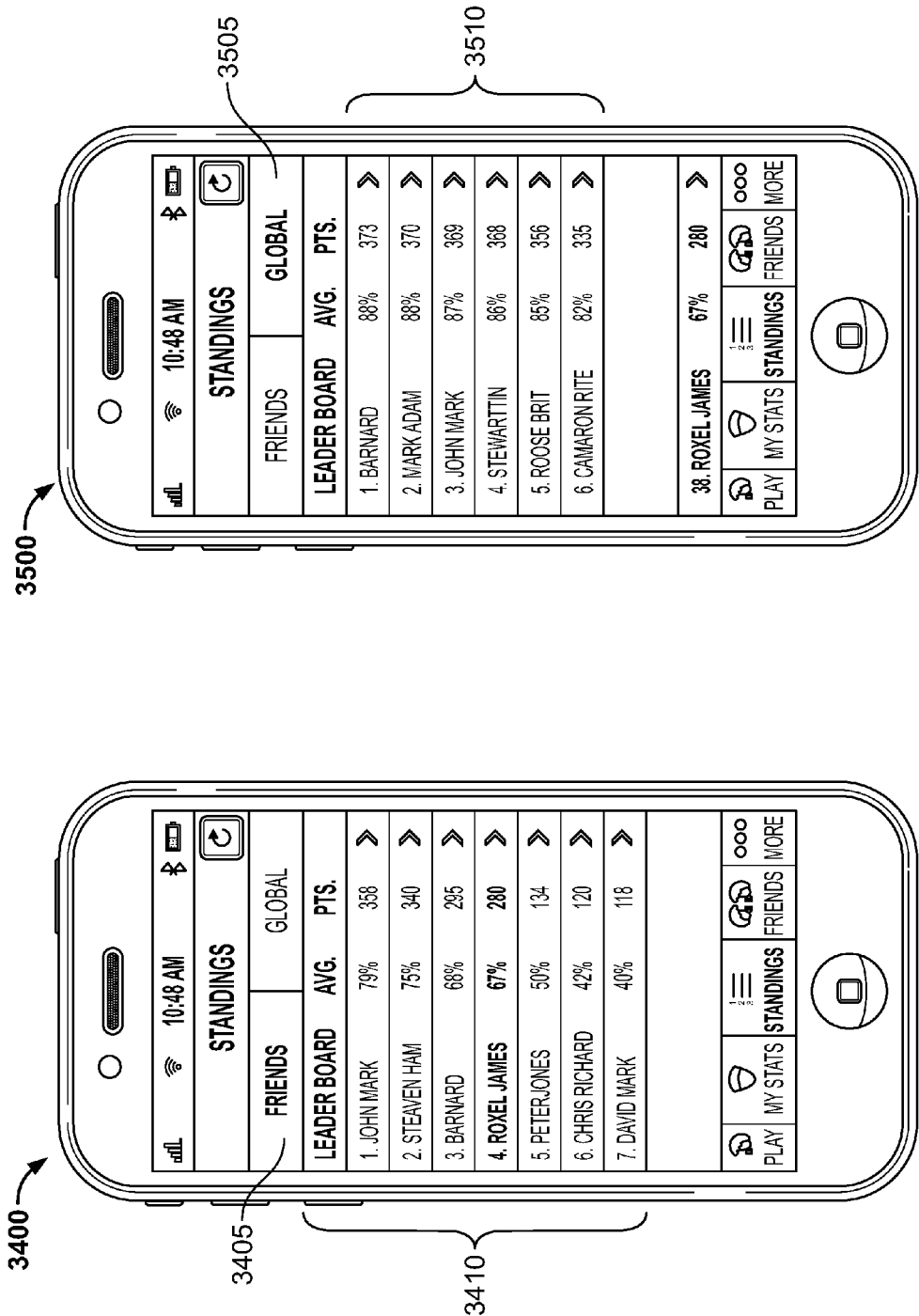

Referring now to FIGS. 34 and 35, exemplary user interfaces 3400 and 3500 displayed in response to selection of the control 3020 that permits access to statistics regarding various metrics of users of the service, by way of example, are shown and described. In response to the user command to access statistics, the user computing device 115 may retrieve statistics determined by the competition management server 105. A user may select a tab 3405 for comparing statistics among the user's friends. The user interface 3400 may display prediction statistics 3410 for the user's friends, as identified in the user's account. The statistics may include each user's number of prediction points. The statistics may include each user's percentage of correct predictions. A user may select a tab 3505 for comparing statistics among all the users of the service. The user interface 3400 may display prediction statistics 3510 for all the users.

Figure 36:
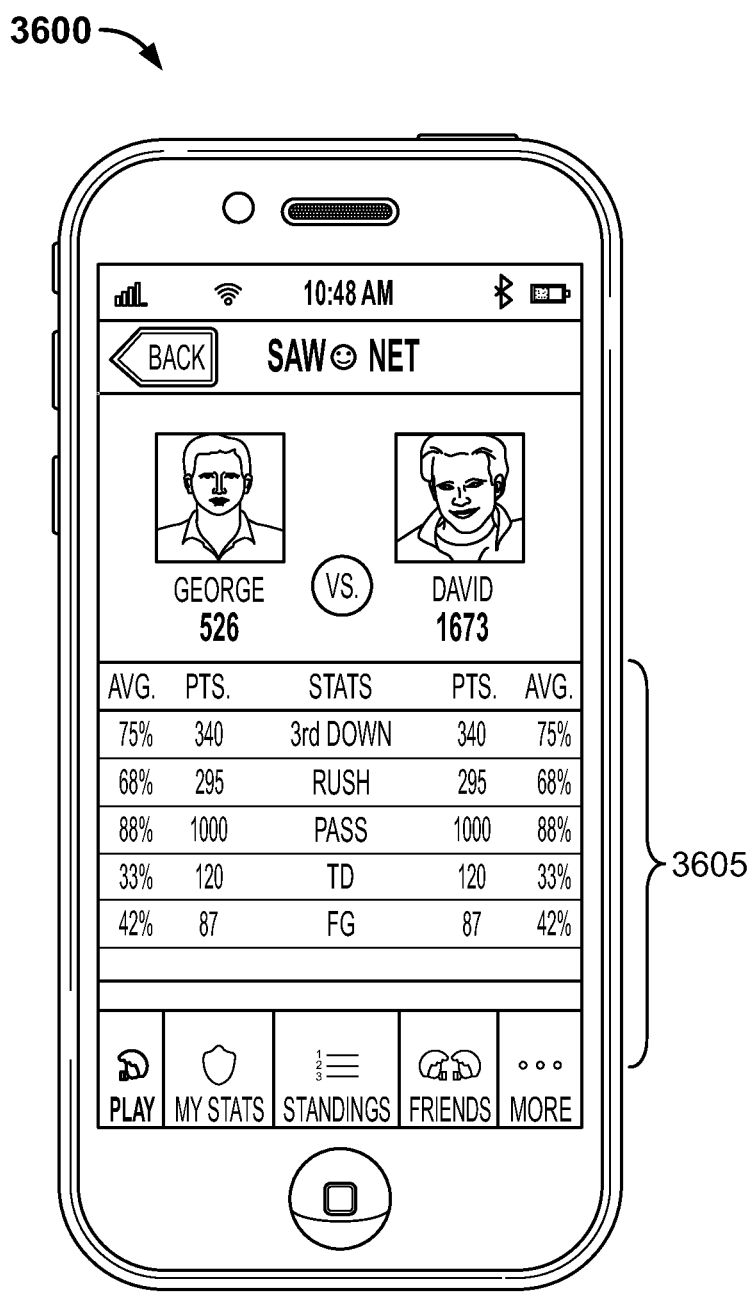

Referring now to FIG. 36, an exemplary user interface 3600 for comparing statistics between two users is shown and described. In some implementations, a user may compare statistics by selecting two users from the list of users, as depicted in the screenshots 3400 and 3500 of FIGS. 34 and 35. In some implementations, the interface 3600 may show an overall comparison of the users' statistics. In some implementations, the interface 3600 may show a comparison of the users' statistics for a particular game. The statistics may be any metric, such as the percentage of correct predictions for rushing, passing, scoring touchdowns, or any other play. The statistics may be the number of points earned by each user for his or her correct predictions.

In some implementations, the competitive strategy prediction service may permit users to invite other users to join the service. The service may enable users to communicate with users through social networks. In response to user selection of the contacts icon 3705, the user computing device 115 may display a user interface 3700, as shown in FIG. 37. The user interface 3700 may include a control 3710 for accessing the user's existing contacts on social networks. The user interface 3700 may include a control 3715 for viewing pending invitations sent to contacts for joining the service. The user interface may include a display of the user's existing contacts within the service 3720.

When a user selects the control 3710 for accessing the user's existing contacts on social networks, the user computing device 115 may display the exemplary user interface 3800 depicted in FIG. 38. The user interface 3800 may include a list 3810 of sources of contacts. In some implementations, sources may include contacts in a social network. In some implementations, sources may include contacts stored in an address book on the computing device 110.

The user may select the control When a user selects the control 3710 for accessing the user's existing contacts on social networks, the user computing device 115 may display the exemplary user interface 3800 depicted in FIG. 38. The user interface 3800 may include a list of sources of contacts. In some implementations, sources 3810, 3815 may include contacts in a social network. In some implementations, sources 3820 may include contacts stored in an address book on the computing device 110.

The user may access contacts in a social network by selecting the connection control 3810, 3815. The user computing device 115 may display a user interface 3900 that lists users on the social network, as shown in FIG. 39. In some implementations, the user computing device 115 may show users on the social network who are already using the competitive strategy prediction service. The user may add a contact to the user's group of friends on the service by selecting an "add" control 3920 adjacent to the contact's name. In some implementations, the user may search for the name of a contact by inputting text into a search field 3910.

Referring now to FIG. 40, a user interface 4000 for inviting contacts to join the competitive strategy prediction service is shown and described. The user may have accessed contacts in an address book stored on the user computing device 115, by way of example. In some implementations, the user interface 4000 may depict contacts 4005 who are already users of the competitive strategy prediction service. The user may add a contact to his or her group of friends on the service by selecting the "add" control 4010 adjacent to the contact's name. In some implementations, the user interface 4000 may depict contacts 4015 who are not users of the service. The user may invite a contact to join the service by selecting the "invite" control 4020 adjacent to the contact's name. In response, the service may send an invitation to the contact via e-mail, by way of example.

Figure 41A:
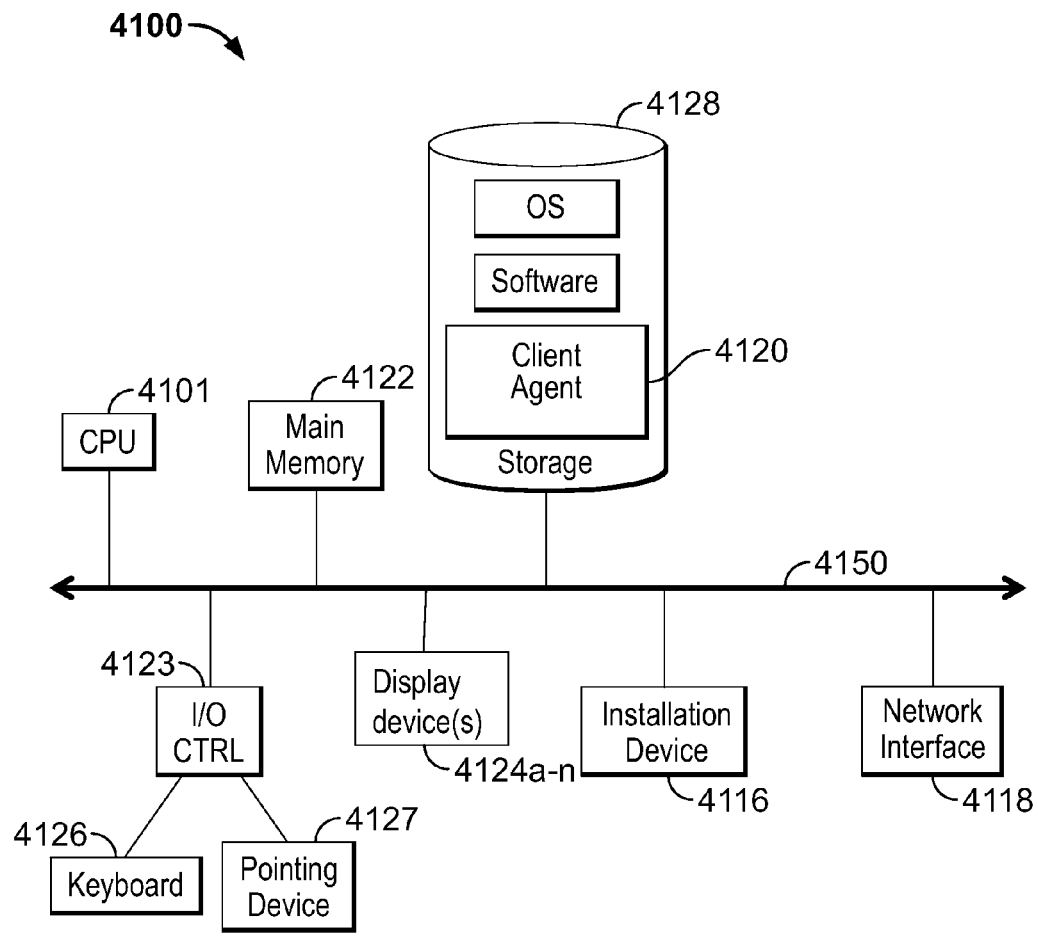
FIGS. 41A and 41B are block diagrams of exemplary computing devices.
Figure 41B:
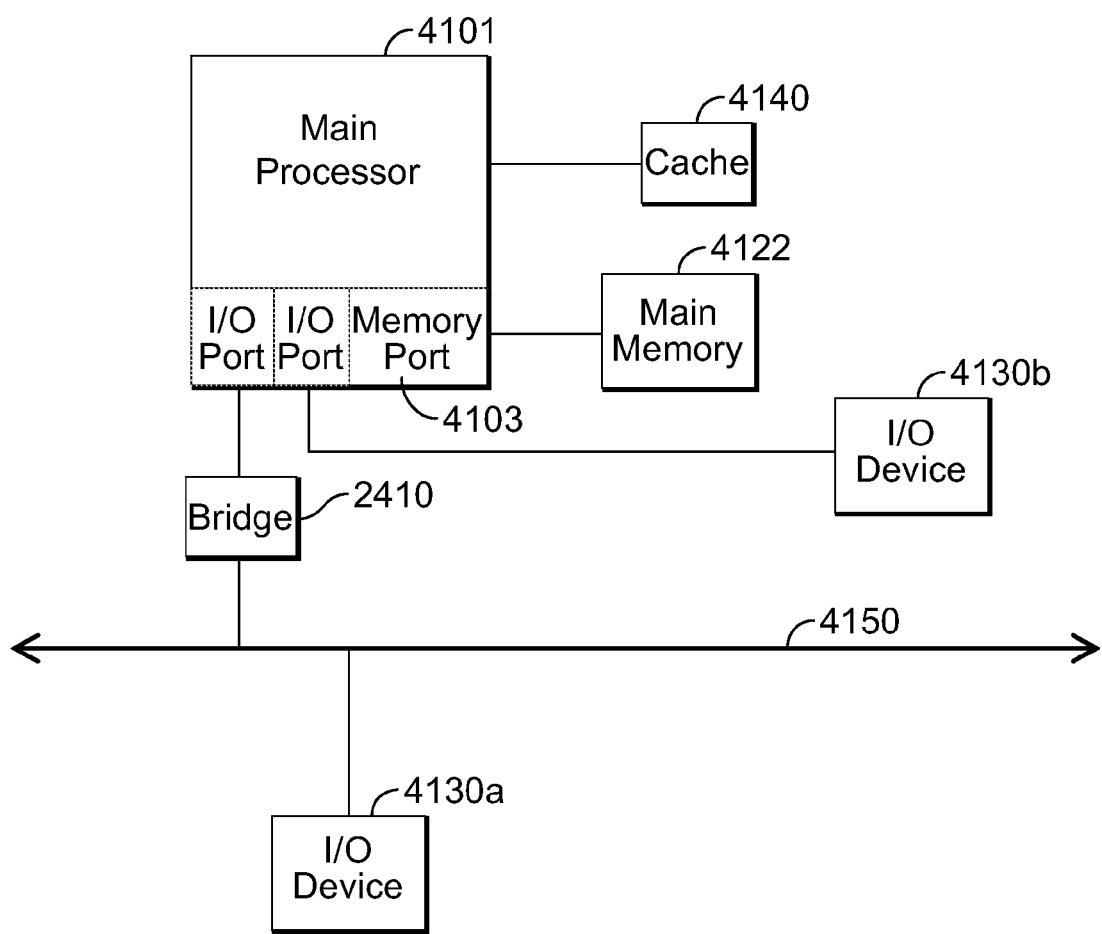

FIGS. 41A and 41B depict block diagrams of an exemplary computing device that can be used in some implementations of the devices of FIG. 1 (e.g., competition management server 105, event feed server 110, computing device 115a-n, remote device 120). As shown in FIGS. 41A and 41B, each computing device includes a central processing unit 4101, and a main memory unit 4122. As shown in FIG. 41A, a computing device 4100 may include a visual display device 4124, a keyboard 4126 and/or a pointing device 4127, such as a mouse. Each computing device 4100 may also include additional optional elements, such as one or more input/output devices 4130a-4130b (generally referred to using reference numeral 4130), and a cache memory 4140 in communication with the central processing unit 4101.

The central processing unit 4101 is any logic circuitry that responds to and processes instructions fetched from the main memory unit 4122. In many implementations, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 4100 may be based on any of these processors, or any other processor capable of operating as described herein.

Main memory unit 4122 may be one or more memory chips capable of storing data and allowing any storage location to be directly accessed by the microprocessor 4101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 4122 may be based on any of the above described memory chips, or any other available memory chips capable of operating as described herein. In the implementation shown in FIG. 41A, the processor 4101 communicates with main memory 4122 via a system bus 4150 (described in more detail below). FIG. 41A depicts an implementation of a computing device 4100 in which the processor communicates directly with main memory 4122 via a memory port 4103. For example, in FIG. 41B the main memory 4122 may be DRDRAM.

FIG. 41B depicts an implementation in which the main processor 4101 communicates directly with cache memory 4140 via a secondary bus, sometimes referred to as a backside bus. In other implementations, the main processor 4101 communicates with cache memory 4140 using the system bus 4150. Cache memory 4140 typically has a faster response time than main memory 4122 and is typically provided by SRAM, BSRAM, or EDRAM. In the implementation shown in FIG. 41A, the processor 4101 communicates with various I/O devices 4130 via a local system bus 4150. Various buses may be used to connect the central processing unit 4101 to any of the I/O devices 4130, including a VESA VL bus, an ISA bus, an EISA bus, a MicroChannel Architecture (MCA) bus, a PCI bus, a PCI-X bus, a PCI-Express bus, or a NuBus. For implementations in which the I/O device is a video display 4124, the processor 4101 may use an Advanced Graphics Port (AGP) to communicate with the display 4124. FIG. 41B depicts an implementation of a computer 4100 in which the main processor 4101 communicates directly with I/O device 4130 via HyperTransport, Rapid I/O, or InfiniBand. FIG. 41B also depicts an implementation in which local busses and direct communication are mixed: the processor 4101 communicates with I/O device 4130 using a local interconnect bus while communicating with I/O device 4130 directly.

The computing device 4100 may support any suitable installation device 4116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 4120, or portion thereof The computing device 4100 may further comprise a storage device 4128, such as one or more hard disk drives or redundant arrays of independent disks, for storing an operating system and other related software, and for storing application software programs such as any program related to the client agent 4120. Optionally, any of the installation devices 4116 could also be used as the storage device 4128. Additionally, the operating system and the software may be run from a bootable medium, for example, a bootable CD, such as KNOPPIX®, a bootable CD for GNU/Linux that is available as a GNU/Linux distribution from knoppix.net.

Furthermore, the computing device 4100 may include a network interface 4118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 4118 may comprise a built-in network adapter, network interface card, PCMCIA network card, card bus network adapter, wireless network adapter, USB network adapter, modem or any other device suitable for interfacing the computing device 4100 to any type of network capable of communication and performing the operations described herein.

A wide variety of I/O devices 4130a-4130n may be present in the computing device 4100. Input devices include keyboards, mice, trackpads, trackballs, touchscreens, microphones, and drawing tablets. Output devices include video displays, speakers, inkjet printers, laser printers, and dye-sublimation printers. The I/O devices 4130 may be controlled by an I/O controller 4123 as shown in FIG. 41A. The I/O controller may control one or more I/O devices such as a keyboard 4126 and a pointing device 4127, e.g., a mouse or optical pen. Furthermore, an I/O device may also provide storage 4128 and/or an installation medium 4116 for the computing device 4100. In still other implementations, the computing device 4100 may provide USB connections to receive handheld USB storage devices such as the USB Flash Drive line of devices manufactured by Twintech Industry, Inc. of Los Alamitos, Calif.

In some implementations, the computing device 4100 may comprise or be connected to multiple display devices 4124a-4124n, which each may be of the same or different type and/or form. As such, any of the I/O devices 4130a-4130n and/or the I/O controller 4123 may comprise any type and/or form of suitable hardware, software, or combination of hardware and software to support, enable or provide for the connection and use of multiple display devices 4124a-4124n by the computing device 4100. For example, the computing device 4100 may include any type and/or form of video adapter, video card, driver, and/or library to interface, communicate, connect or otherwise use the display devices 4124a-4124n. In one implementation, a video adapter may comprise multiple connectors to interface to multiple display devices 4124a-4124n. In other implementations, the computing device 4100 may include multiple video adapters, with each video adapter connected to one or more of the display devices 4124a-4124n. In some implementations, any portion of the operating system of the computing device 4100 may be configured for using multiple displays 4124a-4124n. In other implementations, one or more of the display devices 4124a-4124n may be provided by one or more other computing devices, such as computing devices 4100a and 4100b connected to the computing device 4100, for example, via a network. These implementations may include any type of software designed and constructed to use another computer's display device as a second display device 4124a for the computing device 4100. One ordinarily skilled in the art will recognize and appreciate the various ways and implementations that a computing device 4100 may be configured to have multiple display devices 4124a-4124n.

In further implementations, an I/O device 4130 may be a bridge 4170 between the system bus 4150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 4100 of the sort depicted in FIGS. 41A and 41B typically operate under the control of operating systems, which control scheduling of tasks and access to system resources. The computing device 4100 may be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other implementations, the computing device 4100 may have different processors, operating systems, and input devices consistent with the device. Moreover, the computing device 4100 may be any workstation, desktop computer, server, any other computer, or other form of computing or telecommunications device that is capable of communication and that has sufficient processor power and memory capacity to perform the operations described herein.

The user computing device 115 may be embodied in any one of the following computing devices: a handheld computer; tablet computer; mobile telephone; portable telecommunication device; media playing device; gaming system; netbook; a kiosk; device of the iPad or iPod families of devices manufactured by Apple Computer; or any other type and/or form of computing, telecommunications, or media device that is capable of communication and that has sufficient processor power and memory capacity to perform the methods and systems described herein, including non-mobile devices. In some implementations, the user computing device 115 may be a mobile device such as a Java-enabled cellular telephone or personal digital assistant (PDA), e.g. the i55sr, i58sr, i85s, i90c, i95cl, or the im1100 manufactured by Motorola Corporation; the 6035 or 7135, manufactured by Kyocera; or the i300 or i330, manufactured by Samsung Electronic Co., Ltd. In various implementations, the user computing device 115 may be any device that uses the Android operating system of Google Inc., such as the HTC Dream manufactured by HTC Corporation.

In some implementations, any of actions executed by the competition management server 105, event feed server 110, or remote devices 120 may be executed on one or more computing devices. For example, actions executed by the competition management server 105 may be executed on one or more computing devices. Some actions executed by the competition management server 105 and some actions executed by the event feed server 110 may be executed on the same computing device. The actions executed by the competition management server 105, event feed server 110, and/or remote devices 120 may be allocated among a plurality of computing devices. In some implementations, the computing devices may be devices in a cloud computing environment. In some implementations, the computing devices may communicate over at least one network.

Figure 42:
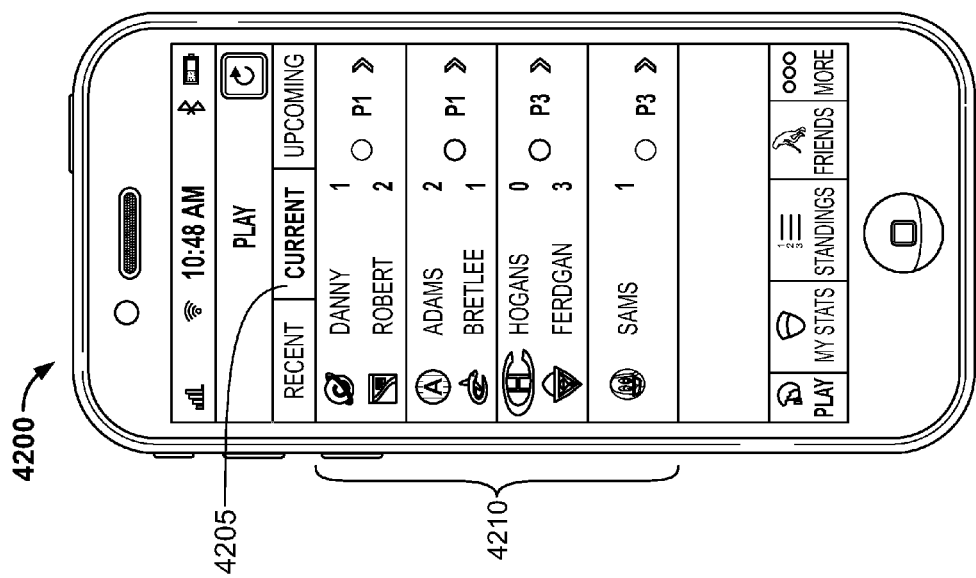
FIG. 42 is an exemplary user interfaces for viewing information about current ice hockey competitions.

Referring now to FIG. 42, an exemplary user interface 4200 displayed on an user computing device 115 when the user selects a tab 42 to view a list of current ice hockey competitions 4210 is shown and described. In some implementations, the list of current ice hockey competitions may identify the teams in the competition, the current score in the competition, and an indication of the amount of time that has elapsed in the competition (e.g., the current period of the competition).

In some implementations, when the user selects the tab 4205 to view a list of current competitions, the competition management server 105 may determine the ice hockey competitions in progress. The competition management server 105 may transmit a list of the competitions to the user computing device 115 for the user's selection. In some implementations, the competition management server 105 may sort the ice hockey competitions according to the user account's preferences.

Figure 43:
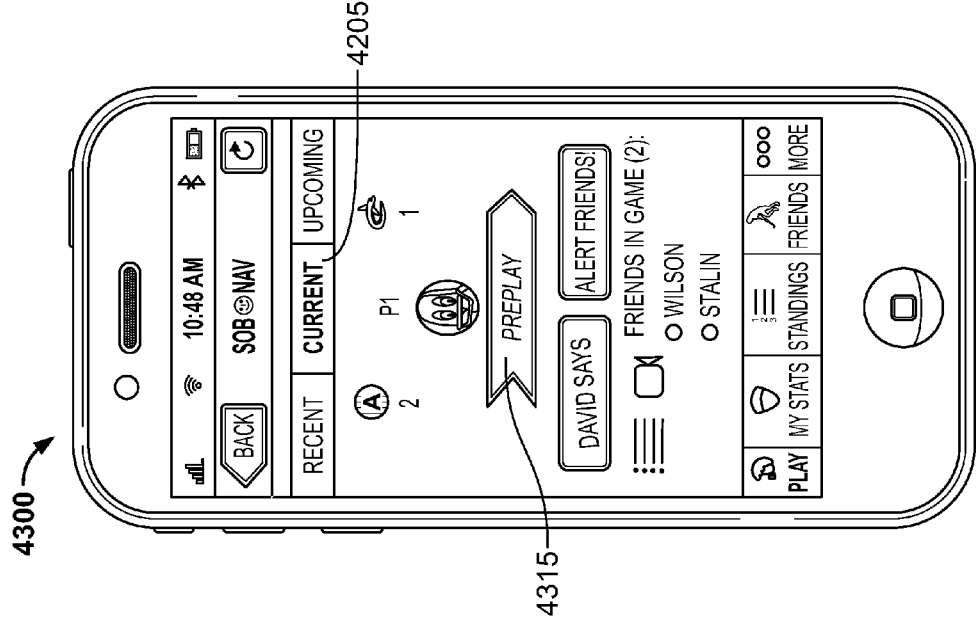
FIG. 43 is an exemplary user interface for using the competitive strategy service for an ice hockey competition.

In some implementations, the user may select a competition from a list of current ice hockey competitions 4210. The user computing device 115 may display a user interface 4300 with the identities of the teams in the competition, the current score, and an indication of the amount of time remaining in the competition (e.g., the current period), as depicted in FIG. 43. The interface 4300 may include a control 4315 that, when activated, would allow the user to begin using the competitive strategy service for the competition.

Referring now to FIG. 44, an exemplary user interface 4400 used in the course of making a prediction for an outcome of a sporting competition is shown and described. The user interface 4400 may permit a user to predict a final score of an ice hockey competition. In some implementations, the interface 4400 may include dials 4410, 4420 for the user to scroll through potential final scores for the teams. In some implementations, the interface 4400 may include a control 4425 whose activation by the user submits the predicted scores to the competition management server 105.

Referring now to FIG. 45, an exemplary user interface 4500 used in the course of making a prediction for plays in a competition is shown and described. The user interface 4500 may include an icon 4505 corresponding to a prediction that Team A will successfully score in a first shootout and an icon 4510 corresponding to a prediction that Team A will not successfully score in a first shootout. The user interface 4500 may include an icon 4515 corresponding to a prediction that Team A will successfully score in a second shootout and an icon 4520 corresponding to a prediction that Team A will not successfully score in a second shootout.

The user interface 4500 may include an icon 4525 corresponding to a prediction that Team B will not successfully score in a first shootout and an icon 4530 corresponding to a prediction that Team B will successfully score in a first shootout. The user interface 4500 may include an icon 4535 corresponding to a prediction that Team B will not successfully score in a second shootout and an icon 4540 corresponding to a prediction that Team B will successfully score in a second shootout.

Figure 46:
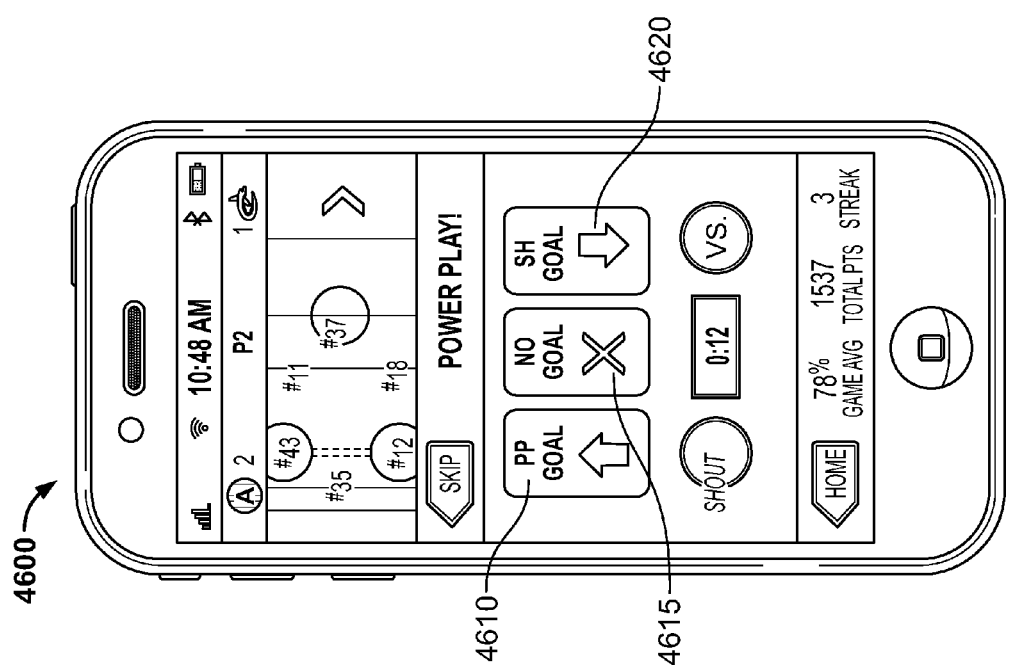

Referring now to FIG. 46, an exemplary user interface 4600 used in the course of making a prediction for plays in a competition. The user interface 4600 may include an icon 4610 corresponding to a prediction that an ice hockey team with at least one player advantage will score a goal during a power play, an icon 4615 corresponding to a prediction that neither ice hockey team will score a goal during a power play, and an icon 4620 corresponding to a prediction that the ice hockey team with at least one player disadvantage will score a goal during a power play.

Figure 47:
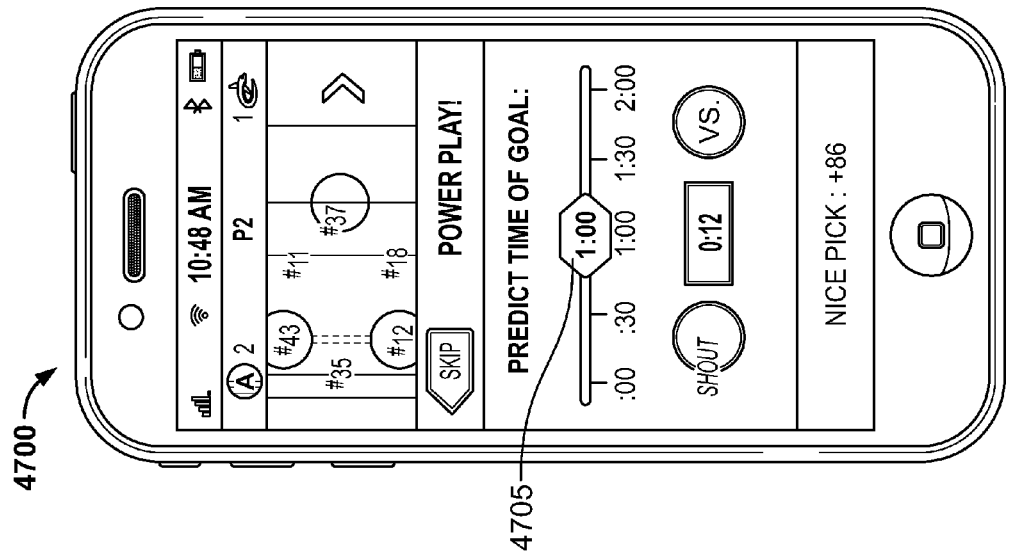

With reference to FIG. 47, a user interface 4700 may display a slider 4705 a user may manipulate for a prediction about the time when an ice hockey team will score a goal during a power play. The user may move the slider 4705 to a position corresponding to the prediction (e.g., 1 minute, 15 seconds).

Figures 48, 49:
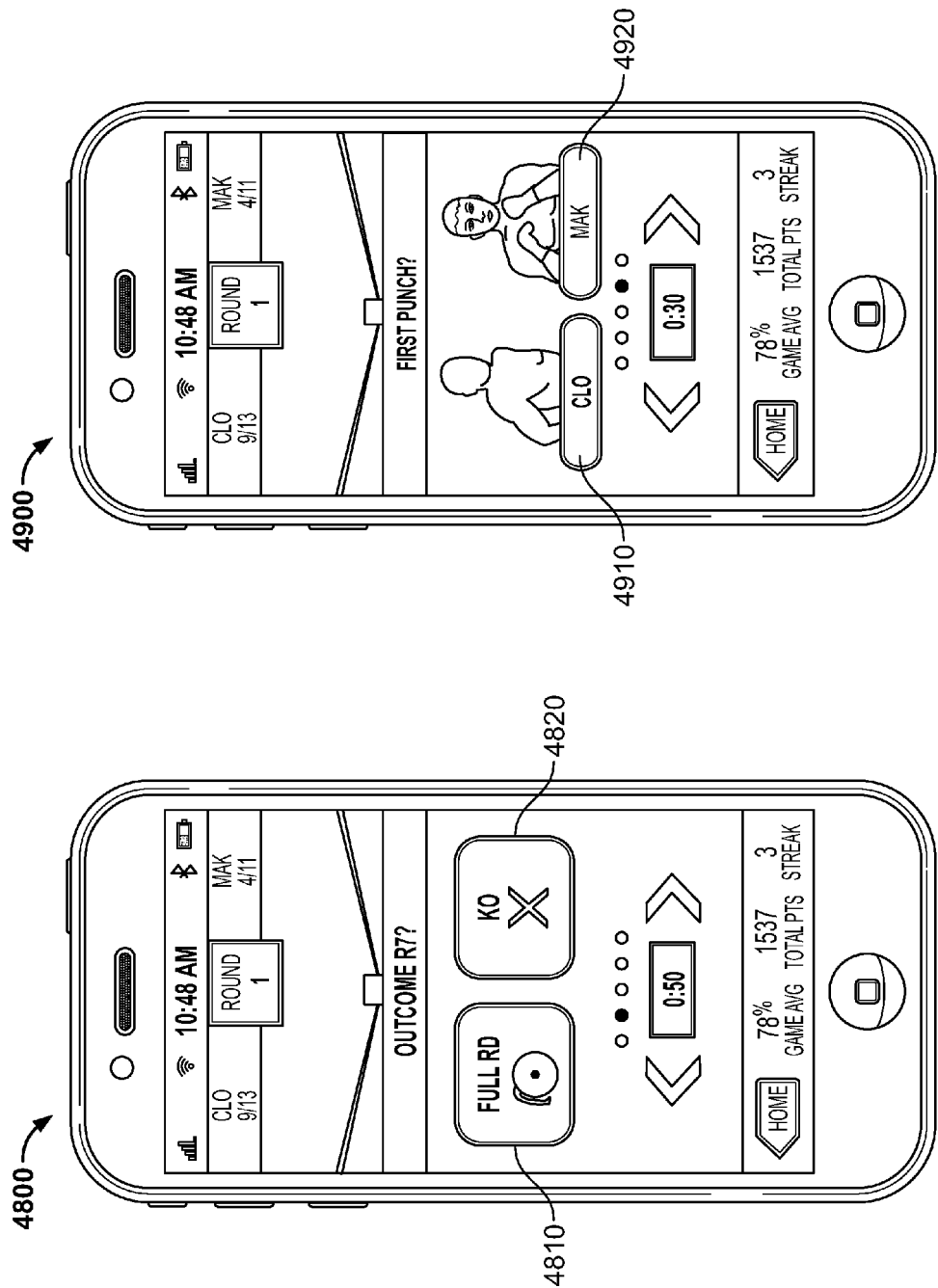
FIGS. 48-49 are exemplary user interfaces used in the course of making a prediction for an outcome in a competition.

With reference to FIG. 48, an exemplary user interface 4800 used in the course of making a prediction for an outcome in a competition is shown and described. The user interface 4800 may include an icon 4810 corresponding to a prediction that a full boxing round will elapse without a boxer being knocked out. The user interface 4800 may include an icon 4820 corresponding to a prediction that a boxer will be knocked out during the round.

With reference to FIG. 49, an exemplary user interface 4900 used in the course of making a prediction for an outcome in a competition is shown and described. The user interface 4900 may include icons 4910, 4920 enabling a user to select which boxer the user predicts will successfully throw the first punch in a boxing match.

Referring now to FIG. 50, an exemplary user interface 5000 for displaying statistics about a boxing match is shown and described. The user interface may display controls enabling a user to select the type of statistics for viewing. For example, the interface 5000 may include a control 5010 for viewing the number of punches thrown. The interface 5000 may include a control 5015 for viewing the percentage of punches thrown successfully. The interface 5000 may include a control 5020 for viewing the statistics for a round.

Referring now to FIG. 51, an exemplary user interface 5100 for comparing statistics between two users who made predictions for a boxing match is shown and described. In some implementations, a user may compare statistics by selecting two users from the list of users. In some implementations, the interface 5100 may show an overall comparison of the users' statistics. In some implementations, the interface 5100 may show a comparison of the users' statistics for a particular boxing match. The statistics may be any metric, such as the percentage of correct predictions for landed punches, thrown punches, first punches of the rounds, final punches of the round, and winner predictions. The statistics may be the number of points earned by each user for his or her correct predictions.

In view of the structure, functions and apparatus of the systems and methods described here, in some implementations, a dynamic, efficient and intelligent system for scoring competitive strategy predictions of users on a play-by-play basis is provided. Having described certain implementations of methods and systems for scoring competitive strategy predictions, it will now become apparent to one of skill in the art that other implementations incorporating the concepts of the disclosure may be used. Therefore, the disclosure should not be limited to certain implementations, but rather should be limited only by the spirit and scope of the following claims.

What is claimed:

1. A method comprising:
receiving, by a first computing device, in real time, an identity of a first event that has occurred in a live sporting competition, the live sporting competition comprising a plurality of events;
identifying, by the processor, one or more potential next plays, wherein the one or more potential next plays are identified based at least in part upon the first event;
causing, by the processor, display of the one or more potential next plays to a user of a second computing device, wherein the second computing device is in communication with the first communication device via a network, wherein a first potential play of the one or more potential next plays comprises position information;
receiving, by the first computing device, a prediction of a next event from the second computing device, wherein the next event comprises a first play of the one or more potential next plays and an indication of a position;
determining, by the processor, a probability of occurrence of the next event;
receiving, by the first computing device, in real time, an identity of a second event that has occurred in the live sporting competition, wherein the second event comprises an actual position;
determining, by the processor, a match between the next event and the second event; and
responsive to determining the match,
determining, by the processor, a number of points based at least in part on a difference between the indication of position and the actual position and based further in part on the probability of occurrence, and
increasing, by the processor, a score of the user based upon the number of points.

2. The method of claim 1, wherein the live sporting competition comprises at least one of a football game, a soccer game, an Olympic event, a baseball game, an ice hockey game, a boxing match, a tennis game, a golf game, a motor sporting competition, a martial arts competition, an automotive racing competition, a basketball game, a cricket game, a rugby game, and a horse race.

3. The method of claim 2, wherein the football game comprises an American football game, and identifying the plurality of potential next plays comprises identifying the plurality of potential next plays based in part on one or more of a number of a down, a number of yards to go, an amount of time left in the football game, a plurality of field positions of a first team competing in the football game, and a current score of the football game.

4. The method of claim 1, wherein determining the probability that of occurrence of the next event comprises:
identifying past events similar to the next event; and
determining the probability of occurrence of the next event based at least in part on the past events.

5. The method of claim 4, wherein:
the live sporting competition comprises an American football game; and
identifying past events similar to the next event comprises identifying past events based at least in part on one or more of an identification of a team competing in the live sporting competition, a number of a down in the live sporting competition, an identity of a quarterback competing in the live sporting competition, a score differential between the teams competing in the live sporting competition, an amount of time remaining in the live sporting competition, and a season record for at least a first team competing in the live sporting competition.

6. The method of claim 4, wherein
the live sporting competition comprises a baseball game; and
identifying past events similar to the next event comprises identifying past events based at least in part on one or more of a score differential between teams competing in the live sporting competition, a period of time within the live sporting competition, a location of the live sporting competition, an identity of a pitcher competing in the live sporting competition, an identity of a batter competing in the live sporting competition, a number of outs in an inning of the live sporting competition, and a position of a runner on a base in the live sporting competition.

7. The method of claim 1, wherein determining the number of points comprises:
determining the number of points based at least in part on an inverse relationship with the probability of occurrence of the next event.

8. The method of claim 1, wherein determining the number of points comprises:
subtracting the probability of occurrence of the next event from 100.

9. The method of claim 1, further comprising, after receiving the identity of the second event:
receiving, by the first computing device, a prediction of a subsequent event from the second computing device;
receiving, by the first computing device, in real time, an identity of a third event that has occurred in the live sporting competition;
determining, by the processor, a mismatch between the subsequent event and the third event; and
responsive to determining the mismatch, decreasing, by the processor, the score of the user.

10. The method of claim 1, wherein receiving the identity of the first event comprises associating a time with the first event, the method further comprising:
after receiving the prediction of the next event, receiving a second prediction of the next event;
determining, based upon the time associated with the first event, that a predetermined period of time has elapsed since receipt of the first event; and
nullifying the second prediction.

11. An apparatus, comprising:
a processor; and
memory, the memory storing instructions that, when executed by the processor, cause the processor to:
receive, in real time, an identity of a first event that has occurred in a live sporting competition, the live sporting competition comprising a plurality of events;
identify one or more potential next plays, wherein the one or more potential next plays are identified based at least in part upon the first event;
cause display of one or more potential next plays to a user of a computing device, wherein the computing device is in communication with the apparatus via a network, and
a first potential play of the one or more potential next plays comprises a range of values;
receive a prediction of a next event from a user of the computing device, wherein the next event comprises a first play of the plurality of potential next plays, and the prediction comprises a value within the range of values;

receive, in real time, an identity of a second event that has occurred in the live sporting competition, wherein the second event comprises an actual value within the range of values;

determine that the next event matches the second event; and responsive to determining the next event matches the second event,
- determine, by the processor, a number of points based at least in part on a difference between the value and the actual value, and
- increase a score of the user by the number of points.

12. The apparatus of claim 11, wherein:

causing display of the plurality of potential next plays comprises causing display of a plurality of selectable controls, wherein each control of the plurality of selectable controls is associated with a respective potential next play;

receiving the prediction of the next event comprises receiving an indication of selection of a first control of the plurality of selectable controls.

13. The apparatus of claim 12, wherein the instructions, when executed, cause the processor to:

prior to receiving the prediction of the next event, receive an indication of exclusion of a second play of the plurality of potential next plays;

responsive to receiving the indication of exclusion, cause display of the plurality of potential next plays to the user of the second computing device, wherein a second control of the plurality of selectable controls is ineligible for selection, the second control of the plurality of selectable controls being associated with the second play.

14. The apparatus of claim 12, wherein:

the first control of the plurality of selectable controls comprises a slider control configured for selection of a time elapse prior to next score, wherein
- the live sporting competition comprises time periods between respective scores, and
- the range of values comprises a range of time; and receiving the prediction of the next event comprises receiving an indication of a time based upon the relative position of the slider control.

15. The apparatus of claim 12, wherein:

the first control of the plurality of selectable controls comprises a slider control configured for selection of a position within a playing field, wherein
- the live sporting competition comprises the playing field, and
- the range of values comprises a range of positions; and receiving the prediction of the next event comprises receiving an indication of a first position based upon a relative position of the slider control.

16. A method comprising:

receiving, via a network, a plurality of predictions of a next event, wherein
- the next event comprises a play within a live sporting competition, and
- each prediction of the plurality of predictions is associated with a respective user of a plurality of users, wherein the respective users are competing via a competitive strategy prediction service, wherein each respective user of the plurality of users is associated with a user account of the strategy prediction service;

receiving, via the network, in real time, an identity of the next event that has occurred in the live sporting competition;

determining, by a processor of the computing device, a probability of occurrence of the next event;

identifying, by the processor, a subset of users of the plurality of users associated with a respective prediction matching the next event;

determining, by the processor, a respective number of points for each user of the subset of users, wherein the respective score is based in part upon the predictions of other users of the plurality of users; and responsive to determining the respective number of points, modifying, by the processor a score of each user of the subset of users by the respective number of points, wherein the respective user account comprises the score.

17. The method of claim 16, further comprising providing, via the network, for display to a first user of the plurality of users, statistics regarding a plurality of metrics of the plurality of users.

18. The method of claim 17, wherein the plurality of metrics comprise one or more of:

(1) a respective number of prediction points associated with each user of the plurality of users, wherein the respective number of prediction points is associated with the next event;

(2) a respective percentage of correct predictions associated with each user of the plurality of users; and (3) a respective score associated with each user of the plurality of users.

19. The method of claim 16, further comprising:

receiving, via the network, a first comment from a first user of the plurality of users, wherein the first comment is directed to at least a second user of the plurality of users; and causing, by the processor, presentation of the first comment to the second user.

20. The method of claim 16, wherein the plurality of users comprises a competition league, wherein the competition league competes, via the competitive strategy prediction service, with a plurality of additional competition leagues, each additional competition league of the plurality of additional competition leagues comprising two or more additional users.

* * * * *